(12) United States Patent
Stankoulov

(10) Patent No.: US 9,569,984 B2
(45) Date of Patent: Feb. 14, 2017

(54) RECORDING, MONITORING, AND ANALYZING DRIVER BEHAVIOR

(71) Applicant: Abalta Technologies, Inc., Torrance, CA (US)

(72) Inventor: Pavel Stankoulov, San Diego, CA (US)

(73) Assignee: Abalta Technologies, Inc., Torrance, CA (US)

( * ) Notice: Subject to any disclaimer, the term of this patent is extended or adjusted under 35 U.S.C. 154(b) by 0 days.

(21) Appl. No.: 13/711,608

(22) Filed: Dec. 11, 2012

(65) Prior Publication Data

US 2014/0162219 A1    Jun. 12, 2014

(51) Int. Cl.
G09B 19/16    (2006.01)

(52) U.S. Cl.
CPC .................. *G09B 19/167* (2013.01)

(58) Field of Classification Search
CPC ... G09B 19/167; G01C 21/3697; G01C 21/32; B60W 40/08; B60W 2550/402; B60W 2540/10; B60W 2520/14; B60W 2520/10; G08G 1/127
USPC .......... 434/65; 701/1, 29, 33, 200, 423, 208, 701/29.3; 705/14.63; 340/441
See application file for complete search history.

(56) References Cited

U.S. PATENT DOCUMENTS

| | | | |
|---|---|---|---|
| 5,570,087 A | 10/1996 | Lemelson | |
| 6,161,071 A | 12/2000 | Shuman et al. | |
| 6,438,472 B1 | 8/2002 | Tano et al. | |
| 7,079,927 B1 | 7/2006 | Tano et al. | |
| 7,389,178 B2 | 6/2008 | Raz et al. | |
| 7,561,054 B2 | 7/2009 | Raz et al. | |
| 7,751,973 B2 | 7/2010 | Ibrahim | |
| 8,131,444 B2 | 3/2012 | Urban et al. | |
| 8,140,358 B1 | 3/2012 | Ling et al. | |
| 8,258,982 B2 * | 9/2012 | Miura | B60R 16/0232 340/439 |
| 8,260,491 B2 | 9/2012 | Brighenti et al. | |
| 8,269,617 B2 | 9/2012 | Cook et al. | |
| 2003/0105558 A1 * | 6/2003 | Steele | 701/1 |

(Continued)

FOREIGN PATENT DOCUMENTS

| | | |
|---|---|---|
| EP | 1498694 A2 | 1/2005 |
| EP | 2042833 A1 | 4/2009 |

*Primary Examiner* — Robert J Utama
*Assistant Examiner* — Eddy Saint-Vil
(74) *Attorney, Agent, or Firm* — Genius Patent APC; Bruce Hare

(57) ABSTRACT

A system that monitors, records and analyzes driver performance includes: a vehicle sensor module that receives data from a set of sensors that each measure a driving characteristic associated with a vehicle; a map data access module that retrieves map data elements indicating various features associated with a path of the vehicle including a set of previously-defined segments, each segment having a set of associated joints each including a set of associated attributes including a set of fixed attributes with unchanging values; and a driver behavior engine that monitors and evaluates driver performance; calculates mathematical differences between a set of evaluation curves and each of multiple corresponding performance curves based on the set of measured driving characteristics, where the mathematical differences are quantified by determining a geometrical area between each evaluation curve and each corresponding performance curve, where the curves are associated with a particular driver and a particular trip.

14 Claims, 20 Drawing Sheets

(56) References Cited

U.S. PATENT DOCUMENTS

| | | |
|---|---|---|
| 2008/0167820 A1 | 7/2008 | Oguchi et al. |
| 2008/0262670 A1* | 10/2008 | McClellan et al. ............. 701/29 |
| 2010/0087984 A1* | 4/2010 | Joseph ............................ 701/33 |
| 2010/0106603 A1* | 4/2010 | Dey et al. .................. 705/14.63 |
| 2010/0152951 A1* | 6/2010 | Chin et al. ...................... 701/29 |
| 2011/0098922 A1* | 4/2011 | Ibrahim ........................ 701/208 |
| 2011/0205045 A1* | 8/2011 | Pilutti et al. .................. 340/441 |
| 2011/0224898 A1* | 9/2011 | Scofield et al. .............. 701/200 |
| 2012/0078509 A1* | 3/2012 | Choi ............................. 701/423 |
| 2013/0211660 A1* | 8/2013 | Mitchell ............... G08G 1/127 701/29.3 |

\* cited by examiner

RECORDING, MONITORING, AND ANALYZING DRIVER BEHAVIOR

BACKGROUND

Many entities may wish to improve performance by reducing and/or eliminating accidents, abuse, operating, maintenance, and/or replacement expenses, and/or other costs associated with operating one or more vehicles. The economic, environmental, and social value of such benefits is significant, especially for commercial fleets and overall driving safety.

There exists a large and growing market for vehicle monitoring systems and methods that facilitate the collection of information related to the contributing causes of vehicle incidents, such as accidents, and provide objective driver evaluation to determine the quality of driving practices. There is also a market for systems and methods for recording various operating parameters over time so as to provide a historical driver profile record to uncover deviations from suggested driving practices, which may further improve driving behavior.

Recent advances for such systems and methods include relying on global navigation satellite systems (GNSS) to track vehicle operation, as well as additional sensors such as gyroscopes, accelerometers, wheel speed pulse, etc. which allow various driving behaviors such as speeding and sudden acceleration to be determined. However, existing solutions don't analyze driver behavior in the context of a map, which provides a model of real world paths (e.g., roads). Furthermore, existing solutions are limited to discrete analysis and do not allow continuous evaluation of driver performance.

Thus there is a need for a driver behavior engine that accurately monitors various parameters to allow analysis of driving behaviors, and that provides contiguous evaluation elements for such driving behaviors.

BRIEF SUMMARY

Some embodiments may provide a system to monitor, record, and/or evaluate driver behaviors and/or performance. Such behaviors may include driving characteristics such as speed, acceleration, stopping, turning, gear shifting, and yaw rate. Various vehicle sensors may be used to determine the various driving characteristics. A warning module provided by some embodiments may be able to warn drivers about driving hazards, unsafe driving practices, and/or potential events.

Some embodiments may include vehicle-specific and/or driver-specific profiles that may affect various parameters. Some embodiments may determine optimal performance levels for various behaviors. Some embodiments may determine various thresholds for various behaviors.

One exemplary embodiment provides a system that monitors, records and analyzes driver performance includes: a vehicle sensor module that receives data from a set of sensors that each measure a driving characteristic associated with a vehicle; a map data access module that retrieves map data elements indicating various features associated with a path of the vehicle including a set of previously-defined segments, each segment having a set of associated points each including a set of associated attributes including a set of fixed attributes with unchanging values; and a driver behavior engine that monitors and evaluates driver performance; calculates mathematical differences between a set of evaluation curves and each of multiple corresponding performance curves based on the set of measured driving characteristics, where the mathematical differences are quantified by determining a geometrical area between each evaluation curve and each corresponding performance curve, where the curves are associated with a particular driver and a particular trip.

Another exemplary embodiment provides an automated method of evaluating driver performance when operating a vehicle. The method includes: receiving a set of map data elements indicating various features associated with a path of the vehicle; receiving a set of measured parameters from a set of sensors associated with the vehicle; defining a set of evaluation curves based on the received set of map data elements; and comparing each evaluation curve from the set of evaluation curves to a performance curve generated at least partly based on the set of measured parameters.

Yet another exemplary embodiment provides a curve-based method of analyzing driver behavior when operating a vehicle. The method includes: generating a set of reference curves based at least partly on a profile associated with the vehicle and a particular driver; generating a measured performance curve based at least partly on data received from a set of sensors adapted to measure various parameters associated with the vehicle; and comparing the set of reference curves to the measured performance curve.

The preceding Summary is intended to serve as a brief introduction to some embodiments of the invention. It is not meant to be an introduction or overview of all inventive subject matter disclosed in this document. The Detailed Description that follows and the Drawings (or "Figures" or "FIGs.") that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matter is not to be limited by the illustrative details in the Summary, Detailed Description and the Drawings, but rather is to be defined by the appended claims, because the claimed subject matter may be embodied in other specific forms without departing from the spirit of the invention.

BRIEF DESCRIPTION OF THE DRAWINGS

The novel features of the invention are set forth in the appended claims. However, for purpose of explanation, several embodiments of the invention are set forth in the following drawings.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Broadly, an embodiment of the present invention generally provides a system to monitor, record, and evaluate driver behavior. Such a system may use vehicle sensors to determine various driving characteristics such as speed, acceleration, stopping, turning, yaw rate, etc. The system may use map data and vehicle position information to create driver behavior curves that may be used to define various thresholds for various driving parameters. Some embodiments may use a warning module to generate warning events to drivers in various driving circumstances. Some embodiments may include methods to collect and store data, predict future driving paths, analyze driver behavior, and provide offline analysis.

Several more detailed embodiments of the invention are described in the sections below. Section I provides a conceptual description of the driver behavior engine architecture. Section II describes a curve-based approach to driver reporting and/or analysis. Section III then describes path-based data and/or analysis. Next, Section IV describes probabilistic weighting of driving events in some embodiments. Section V then describes various methods of operation used to generate and modify profiles, collect and store data, predict driving paths, provide warnings to drivers, and provide offline analysis. Section VI includes examples of driver behavior curves for driver characteristics such as speed, safety, acceleration, yaw rate, and stopping. Section VII then describes a process used to define an application of some embodiments. Lastly, Section VIII describes a computer system which may implement some of the embodiments of the invention.

I. System Architecture

Figure 1:
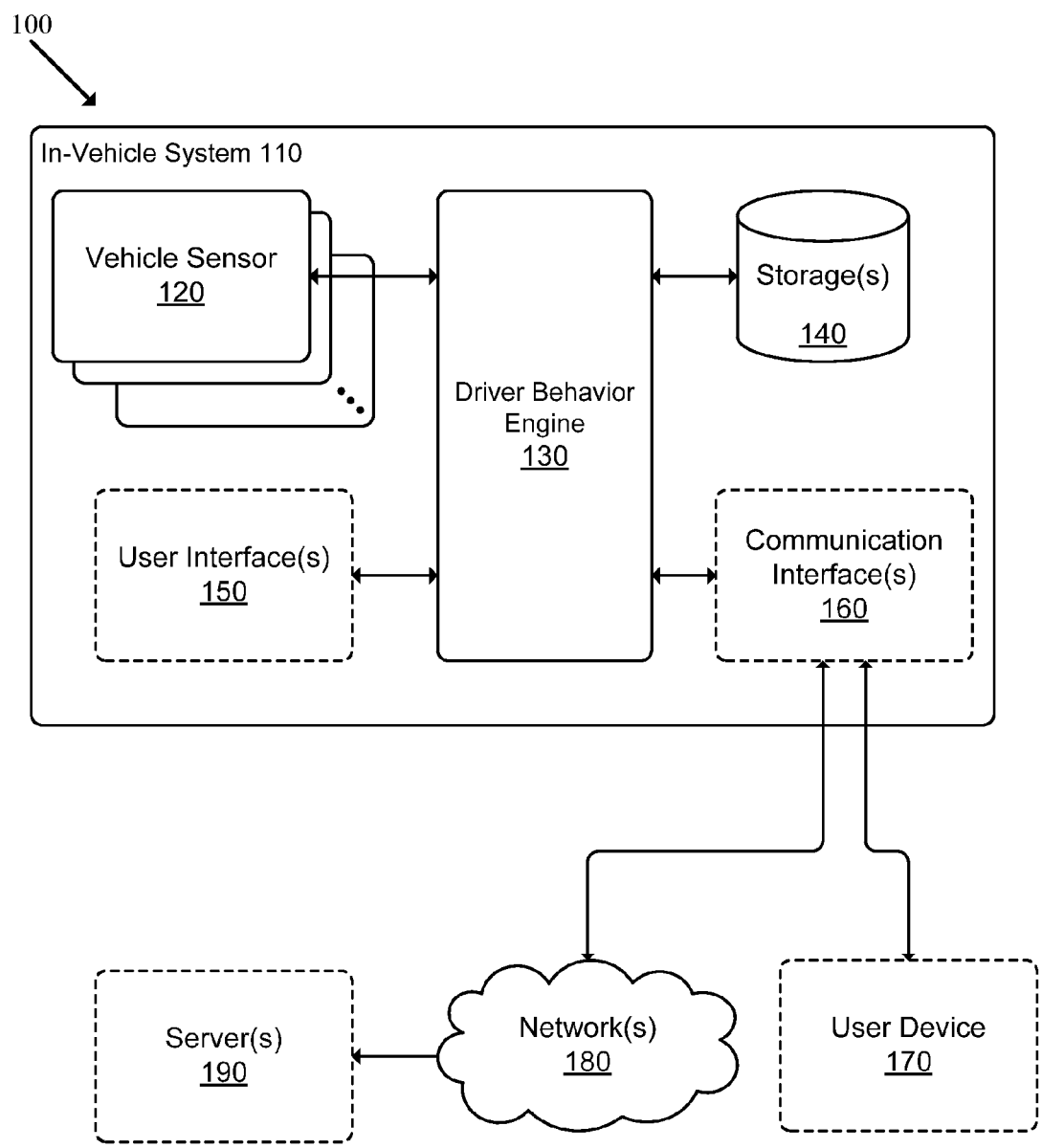
FIG. 1 illustrates a schematic block diagram of a conceptual system according to some embodiments of the invention.

FIG. 1 illustrates a schematic block diagram of a conceptual system 100 according to some embodiments of the invention. Specifically, this figure shows various system elements and the communication pathways available to those elements. As shown, the system may include an in-vehicle system 110, a set of vehicle sensors 120, a driver behavior engine 130, a set of storages 140, a set of user interfaces 150, a set of communication interfaces 160, a user device 170, one or more networks 180 (e.g., local networks, wide-area networks, sets of networks, etc.), and one or more server(s) 190.

The in-vehicle subsystem 110 may be included in a car, truck, motorcycle, watercraft, aircraft, and/or any other appropriate vehicle that is able to be operated directly and/or remotely. The vehicle may be adapted to house various elements of the driver behavior engine 130. The system 100 may be adapted to communicate with multiple vehicles 110, either serially or in parallel. For instance, each of a set of fleet vehicles may independently communicate with the server 190 of some embodiments.

The set of vehicle sensors 120 may include GNSS sensors (such as global positioning system (GPS), global navigation satellite systems (GLONASS), Galileo, etc.), inertial sensors (i.e., gyroscopes, accelerometers, etc.), wheel speed sensors, differential speed sensors, radar sensors, outside temperature sensors, laser sensors, camera sensors, and/or any other appropriate sensors. The sensors may provide information related to the vehicle, such as speed, odometer readings, revolutions per minute (RPMs), pedal position (e.g., gas, brake, clutch, etc.), turn signal indications, fuel level, battery charge level, gear position, etc. The sensors may be adapted to communicate with the driver behavior engine 130 in various appropriate ways (e.g., using a serial bus such as a controller area network (CAN) bus, using wireless communication links, etc.). Although the sensors 120 are represented as physical elements with direct communication pathways to the driver behavior engine 130, one of ordinary skill in the art will recognize that systems of some embodiments may receive data associated with one or more sensors over an existing bus or other communication interface (and/or through one or more processing modules) without communicating directly with any, some, or all of the sensors.

The driver behavior engine may be adapted to communicate with the vehicle sensors 120, set of storages 140, set of user interfaces 150, set of communication interfaces 160, and/or other system components. The driver behavior engine may be adapted to analyze and/or record data regarding driving behavior.

The set of storages 140 may include various files (and/or databases) that relate to various vehicle characteristics, recorded data, map databases, and/or other parameters and/or information. For example, the set of storages may include information regarding a vehicle, user, and/or different applications (e.g., safety, fuel efficiency, teen driving, etc.) associated with the vehicle and/or user. The set of storages may include parameters that define which types of behavior curves to support and/or how to calculate various safety curves and/or optimal curves. For instance, optimal speed curves for an inexperienced teenage driver may be different than optimal speed curves for an experienced driver. Likewise optimal speed curves for a large sport utility vehicle (SUV) may be different than speed curves for a coupe. The set of storages may be adapted to communicate with the driver behavior engine 130 and/or other elements as appropriate.

The optional user interfaces 150 may be adapted to communicate with the driver behavior engine 130 and to provide various input/output features to a system user. The user interfaces 150 may be adapted to allow a user to interact with the driver behavior engine 130 in various appropriate ways (e.g., by displaying data, by receiving inputs through a touchscreen and/or keyboard, etc.). Each user interface 150 may include various appropriate elements (e.g., buttons, icons, etc.) that may allow a user to control and/or interact with the system. The optional user interface 150 may include non-visual indicators such as sound and/or be integrated with various in-vehicle indicators such as a vibrating seat, steering wheel controls, etc.

The optional set of communication interfaces 160 may be adapted to communicate with the driver behavior engine 130 (and/or other system elements), an optional user device 170, and/or the server 190, via network(s) 180. The set of communication interfaces 160 data and/or instructions to be sent among the server(s) 190, a user device 170, storages 140, driver behavior engine 130, and/or other system elements. The set of communication interfaces 160 may communicate and/or translate data using various appropriate methods and/or protocols.

The user device 170 may be adapted to communicate and/or otherwise interact with the system through communication interface 160. The user device 170 may be a mobile device, tablet, PC, and/or any other appropriate device. The user device may allow a user to download information from the system and/or upload information to the system, as appropriate.

The network(s) 180 may allow communication among the system 100 and various external resources (e.g., server(s) 190). The network(s) 180 may include one or more local networks, wireless networks, sets of networks (e.g., the Internet), etc. The server(s) 190 may process and/or store data received from and/or sent to the various system elements through the network(s) 180.

During operation, a vehicle user may invoke the system 100 (e.g., by activating an application, by powering on a vehicle, etc.). The driver behavior engine 130 may then download one or more driver and/or vehicle profiles from the storages 140. Such driver and/or vehicle profiles may be associated with one or more users of the system. During operation of the vehicle, the various sensors 120 may collect information related to the operation and/or performance of the vehicle. Such information may be passed to storage 140 and/or may otherwise be manipulated. The driver behavior engine 130 may continuously retrieve information related to the measured and/or predicted path(s) of the vehicle. Such information may be passed directly to the storage 140 and/or analyzed in various ways (e.g., by comparing such measured information to various thresholds to determine whether a warning should be issued). Such warnings and/or other feedback may be provided to an optional user interface 150. Alternatively, such information may be stored to storage(s) 140 without any indication to a driver or other user. In addition, such information may be transmitted to the server(s) 190 over the network(s) 180 such that the information may be stored and/or analyzed in real-time and/or offline.

One of ordinary skill in the art will recognize that the system 100 is conceptual in nature and may be implemented in various different ways without departing from the spirit of the invention. For instance, various elements may be removed and/or various other elements may be included. In addition, multiple elements may be combined into a single element and/or a single element may be divided into multiple elements. Furthermore, various other communication pathways may be utilized and/or included.

Figure 2:
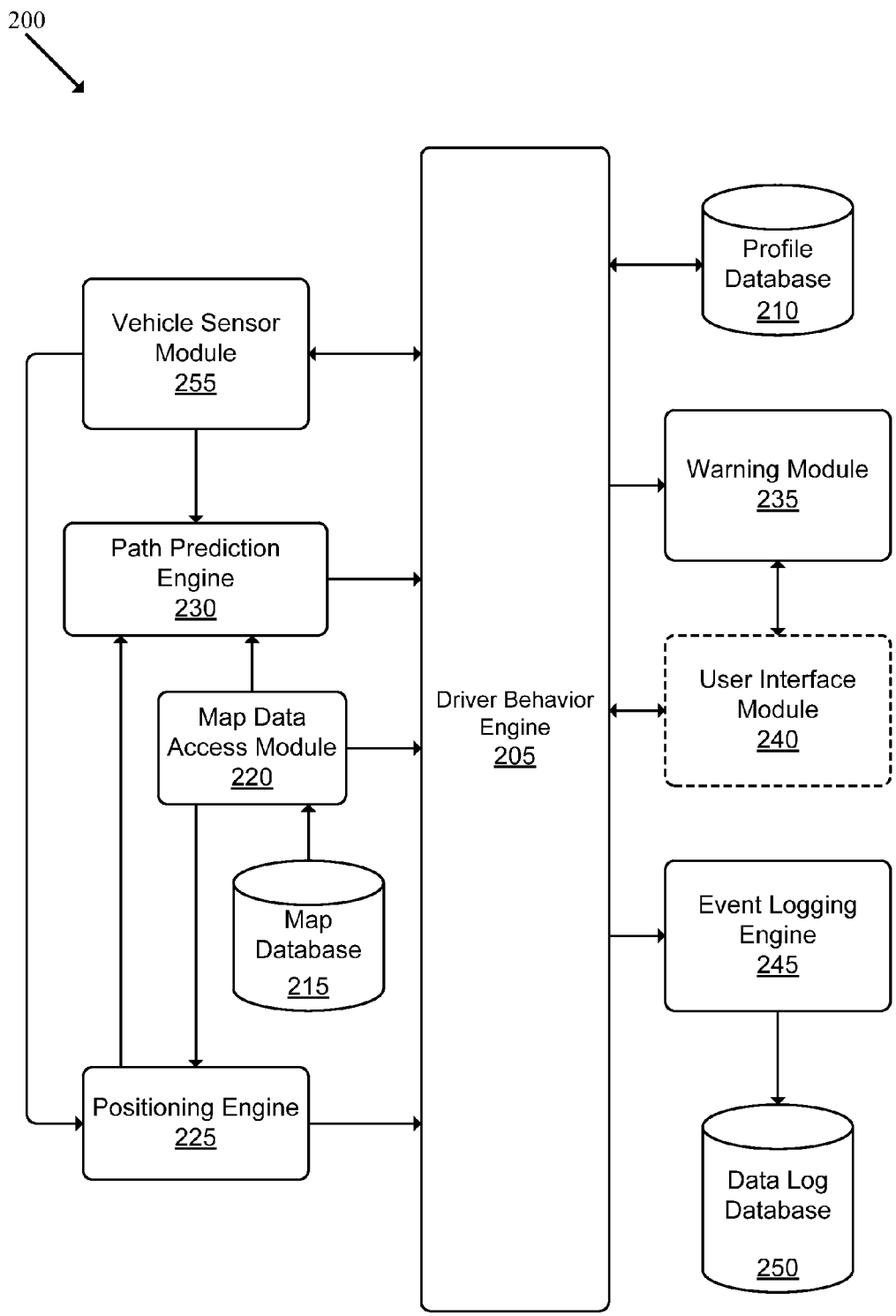
FIG. 2 illustrates a schematic block diagram of an in-vehicle architecture included in some embodiments of the system of FIG. 1.

FIG. 2 illustrates a schematic block diagram of an in-vehicle architecture 200 used by some embodiments of system 100. Specifically, this figure shows various sub-elements that may be included in the driver behavior engine 130 of FIG. 1. As shown, the in-vehicle architecture 200 may include a driver behavior engine 205, a profile database 210, a map database 215, a map data access module 220, a positioning engine 225, a path prediction engine 230, a warning module 235, an optional user interface module 240, an event logging engine 245, a data log database 250, and a vehicle sensor module 255.

As described above and below, the driver behavior engine 205 may include software and/or hardware elements that may perform driver analyses based on various data. The driver behavior engine may be adapted to communicate with vehicle sensor module 255, profile database 210, map data access module 220, positioning engine 225, path prediction engine 230, warning module 235, user interface module 240, and/or event logging engine 245.

The profile database 210 may include sets of files that store and/or define various vehicle and/or user characteristics. The profile database may include different profiles for different vehicles, different users, and/or different applications (e.g., safety, fuel efficiency, teen driving, etc.). The profile database may include parameters that define which behavior curves to support and/or how to calculate various safety curves and/or optimal curves. The profile database may be adapted to communicate with the driver behavior engine 205 and/or various other system elements.

The map database 215 may store data related to roads and/or terrain, and may include information such as elevation, surface type, steepness, curve radius, etc. In addition, the map database 215 may store data related to various features (e.g., information regarding speed limits, traffic signals and/or signage, number of travel lanes, road classes, etc.) and/or attributes of the environment (e.g., traffic conditions, traffic patterns, construction notices, weather forecasts, etc.). The map database may be adapted to communicate with the map data access module 220.

The map data access module may provide efficient, database format independent access to the map database 215. The map data access module 220 may be adapted to receive information from the map database 215, and/or communicate with the driver behavior engine 205, the positioning engine 225, and/or the path prediction engine 230.

The positioning engine 225 may be adapted to receive information from the vehicle sensors 120 and the map data access module 220. The positioning engine 225 may process the received information to determine a position of the vehicle. The positioning engine 225 may be adapted to send such determined position information to the driver behavior engine 205, and/or the path prediction engine 230. The positioning engine 225 may include various software modules that are responsible for receiving vehicle positioning sensor information such as GPS, inertial sensors, etc. and matching the received information to a position on a road segment from the map database 215. The positioning engine 225 may return a set of map segments, each with an associated probability. The positioning engine may be used to identify map segments associated with the vehicle travel path and construct a vehicle map path based at least partly on the identified map segments.

The path prediction engine 230 may be adapted to receive information from the vehicle sensor module 255, the map data access module 220, and the positioning engine 225. The path prediction engine 230 may be adapted to send information to the driver behavior engine 205. The path prediction engine 230 may process the received information in order to predict a set of driving paths of the vehicle ahead of the current vehicle position. Such path prediction will be described in more detail in Section III below.

The warning module 235 may be adapted to receive information from the driver behavior engine 205 and/or communicate with the user interface module 240. The warning module 235 may provide real-time warnings and/or guidance to drivers. The warning module may, for example, display information on a vehicle display, head-unit, instrument cluster, dashboard, and/or any other appropriate location. The warning module may be adapted to emit sounds and/or voice commands/warnings. The warning module may be adapted to provide other warning methods such as seat and/or steering wheel vibration, colored and/or flashing lights, written messages, and/or any other appropriate warning method. Such warnings may be based on various appropriate factors.

The user interface module 240 may be adapted to communicate with the driver behavior engine 205, and the warning module 235. The user interface module 240 may be adapted to provide information and/or warnings to a user and/or allow the user to interact with the driver behavior engine 205. The user interface module 240 may include various appropriate elements (e.g., buttons, icons, etc.) that may allow a user to control and/or interact with the system.

The event logging engine 245 may be adapted to receive information from the driver behavior engine 205 and send information to the data log database 250. The event logging engine 245 may continuously record received information. Such received information may include vehicle sensor information, map information, warning information, driver behavior information, environmental information, and/or other appropriate information.

The data log database 250 may be adapted to receive information from the event logging engine 245. The data log database 250 may store information received from the event logging engine 245 including warning events, driver characteristics, vehicle characteristics, etc.

The vehicle sensor module 255 may receive measured data from at least one vehicle sensor. A single vehicle sensor module may receive data from multiple vehicle sensors and multiple vehicle sensor types. The sensor types may include GNSS sensors (GPS, GLONASS, Galileo, Beidou, etc.), inertial sensors (i.e., gyro, accelerometers, etc.), radar sensors, laser sensors, camera sensors, and/or any other appropriate sensors. The sensors may provide various sensor information available from the vehicle, such as speed, odometer readings, revolutions per minute (RPMs), gas pedal position, differential speed pulse, brake pedal position, turn signal indications, fuel level, battery charge level, front shield wipers status, outside temperature, gear position, etc. The vehicle sensor module may be adapted to communicate with the driver behavior engine 205, the positioning engine 225, and/or the path prediction engine 230, as appropriate.

During operation, the vehicle sensor module 255 may send sensor information to the positioning engine 225, driver behavior engine 205 and/or the path prediction engine 230. The map data access module 220 may retrieve map information from the map database 215 and send efficient and database-formatted map information to the driver behavior engine 205, the positioning engine 225, and/or the path prediction engine 230. The positioning engine 225 may use information received from the vehicle positioning sensor(s) to match the vehicle position to a position on a road segment received from the map data access module 220.

The path prediction engine 230 may be used to predict the path of a vehicle ahead of a current position. The path prediction engine may use information received from the vehicle sensor module 255, the positioning engine 225 and the map data access module 220 to determine the most likely path a vehicle will take and calculate various probabilities of taking various different paths.

The driver behavior engine 205 may perform driver analyses based on current position information received from the positioning engine 225, predicted path information received from the path prediction engine 230, map database 215 information received from the map data access 220, and/or other vehicle sensor information received from vehicle sensor module 255. The driver behavior engine 205 may use profile information from the profile database 210 that define expected driver behavior, vehicle characteristics, and/or different types of applications. In addition, the driver behavior engine 205 may estimate driver behavior values (e.g., speed, acceleration, etc.) and assign probabilities to the associated estimated values.

The driver behavior engine 205 may generate driver behavior curves based on a vehicle's current position, a vehicle's predicted path, profile information, and/or map information, and/or may compare the behavior curves with expected curves taking into account various probabilities. The driver behavior engine may generate warning events and/or calculate a driver behavior score, as appropriate. The driver behavior engine may update profiles based on measurable input from the vehicle sensor module 255 and provide a self-learning system. The driver behavior engine 205 may send various driving data to the event logging engine 245, which, in turn, may send data to the data log database 250. Data stored in the data log database may be used for offline post processing and analysis.

The warning module 235 may receive information from the driver behavior engine 205 and may communicate with the user interface module 240. The warning module 235 may be configured to provide safety warnings, alerts, and/or guidance messages to drivers to improve their driving skills, provide and improve safety, monitor and improve fuel efficiency, teach and/or improve teen driving, etc.

One of ordinary skill in the art will recognize that the architecture 200 is conceptual in nature and may be implemented in various different ways without departing from the spirit of the invention. For instance, the architecture may be implemented as an embedded system (i.e., some or all of the elements may be provided by a device such as a computer). As another example, various elements may be removed and/or various other elements may be included. In addition, multiple elements may be combined into a single element and/or a single element may be divided into multiple elements. Furthermore, various other communication pathways may be utilized and/or included.

Figure 3:
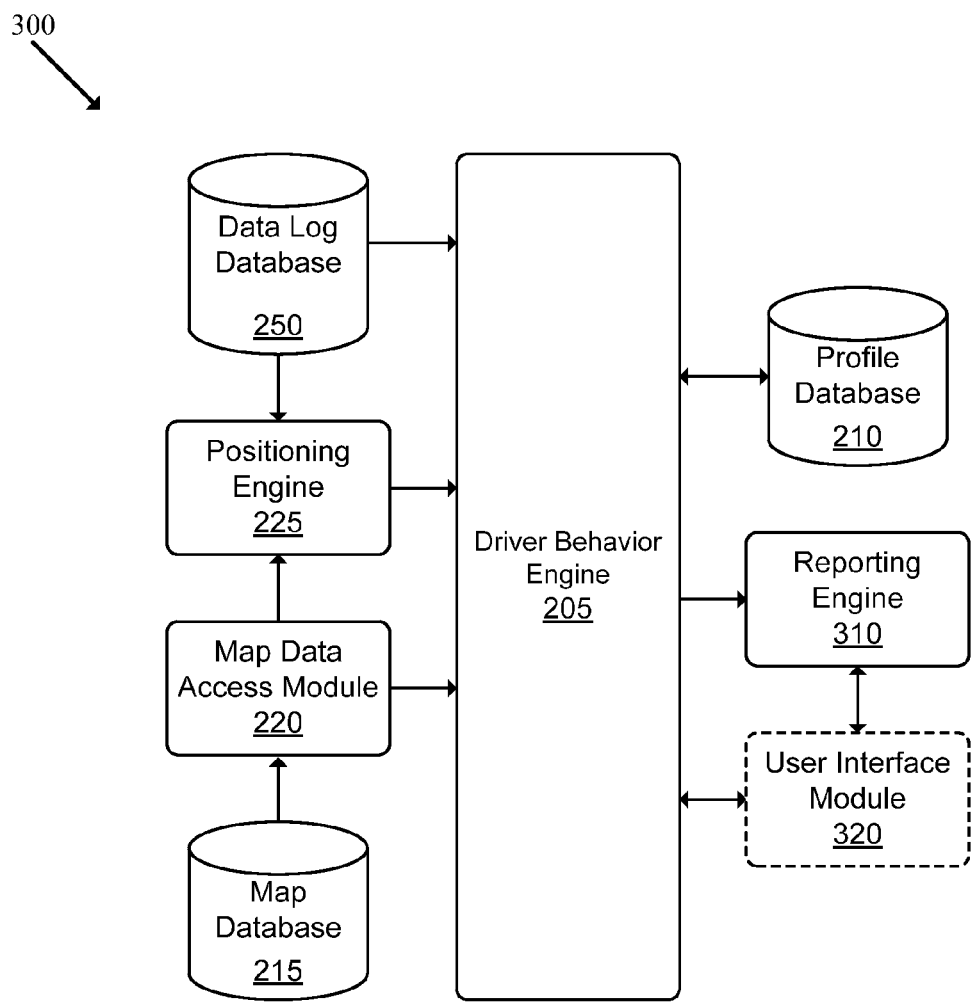
FIG. 3 illustrates a schematic block diagram of an offline architecture provided by some embodiments of the system of FIG. 1.

FIG. 3 illustrates a schematic block diagram of an offline architecture 300 provided by some embodiments of the system of FIG. 1. Specifically, FIG. 3 shows various components and communication pathways that may allow the system to be operated independently of any vehicle. As shown, the offline architecture may include a driver behavior engine 205, a profile database 210, a map database 215, map data access module 220, a positioning engine 225, a data log database 250, a reporting engine 310, and/or a user interface module 320.

The various system elements 205-250 may be similar to those elements described above in reference to FIG. 2. Such elements may be adapted to evaluate various data streams as if they were presented during in-vehicle operation.

The reporting engine 310 may be adapted to receive information from the driver behavior engine 205 and/or communicate with the user interface module 320. The reporting engine 310 may process various driving data, and generate reports based upon received data. Such reports may include descriptions of driving events, suggestions for improving driving behavior, etc.

The user interface module 320 may communicate with the driver behavior engine 205 and/or the reporting engine 310. The user interface module 320 may be adapted to allow a user to interact with the driver behavior engine 205. For instance, the user interface module 320 may receive reports from the reporting engine 310 and convert the reports to a user-readable format.

During operation, the driver behavior engine 205 may receive profile information from the profile database 210, map data from the map data access 220, positioning information from the positioning engine 225, and other vehicle sensor information from the data log database 250. The driver behavior engine 205 may use this information to construct optimal and critical curves, and compare the constructed curves with the drive curves from the vehicle.

The driver behavior engine 205 may use the optimal curves and critical curves to create warning or violation events, calculate a driving score. This information may be sent, along with various other data, to the reporting engine 310 for further processing. Information processed by the reporting engine may be converted to a user-readable form by the user interface module 320. For example, data in the reporting engine 310 can be generated into a written report by the user interface module 320. The user interface module 320 may also allow a user to input information into the driver behavior engine 205. Other embodiments may include user interface modules with computer screens, graphic data, etc.

Some embodiments of system 300 may be implemented using various web services and/or web-based user interfaces (UIs) such as may be provided using a browser. In some embodiments, third-party applications may be able to access some or all elements of the system 300 through an application programming interface (API) and/or other appropriate ways.

One of ordinary skill in the art will recognize that the architecture 300 is conceptual in nature and may be implemented in various different ways without departing from the spirit of the invention. For instance, various elements may be removed and/or various other elements may be included. In addition, multiple elements may be combined into a single element and/or a single element may be divided into multiple elements. Furthermore, various other communication pathways may be utilized and/or included.

Figure 4:
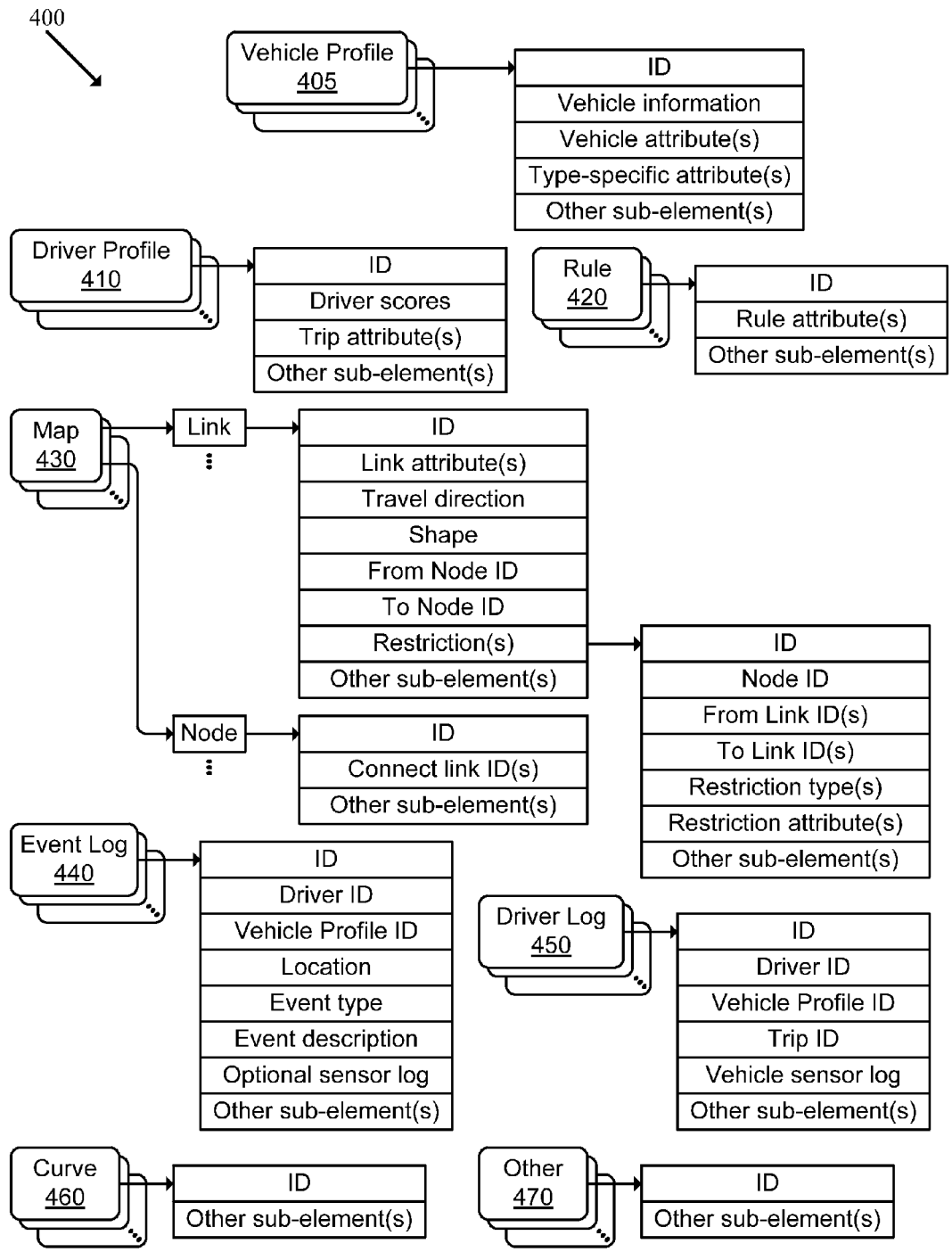
FIG. 4 illustrates a data structure diagram according to some embodiments of the invention.

FIG. 4 illustrates a data structure diagram 400 according to some embodiments of the invention. Specifically, this figure shows various data elements and sub-elements that may be generated, stored, accessed, and/or manipulated by some embodiments. As shown, the system data structure(s) may include vehicle profile data elements 405, driver profile data elements 410, rule data elements 420, map data elements 430, event log data elements 440, driver log data elements 450, curve data elements 460, and/or other data elements 470.

Each vehicle profile data element 405 may include a vehicle profile ID, vehicle information, vehicle attributes, type-specific attributes, and/or other sub-elements. Vehicle information may include, for instance, a vehicle's make, model, VIN, etc. Vehicle attributes may include, for instance, a vehicle's weight, cross-section, drive train efficiency, etc. Vehicle type-specific attributes may include, for instance, information such as an electric vehicle's maximum battery charge, a gross weight of a vehicle, etc.

Each driver profile data element 410 may include, for example, a driver profile ID, driver scores, trip attributes, and/or other sub-elements. Driver scores (or drive style factors) may include, for instance, various scores for different observable driving characteristics. For example, a driver may have different scores for braking, acceleration, safe turning, fuel efficient driving, etc. Trip attributes may include, for instance, such information as load weight, type of load (e.g., passengers, cargo, hazardous materials, etc.), and/or vehicle configuration (e.g., number/size of wheels, whether trailers are present, etc.).

Each rule data element 420 may include a rule ID, rule attributes, and/or other sub-elements, as appropriate. A rule may include various specific elements depending on the type of rule being implemented and any attributes that may be associated with the rule. A rule may be used to identify one or more driving events (and/or other appropriate performance criteria). For instance, in some embodiments a rule may include a threshold (which may be defined as a curve) and the rule may identify an event whenever sensed data (e.g., driving speed) exceeds the threshold. As another example, in some embodiments a rule may include multiple thresholds. Such a rule may include a first threshold (which may be defined as a curve) and a second threshold (which may be defined as an area or a length of time). When the first threshold is exceeded, the rule may identify a potential event, where the potential event may not be classified as an event until the second threshold is exceeded (e.g., when an amount of time exceeding the threshold has passed, when an area defined between a set of curves exceeds a threshold value, etc.).

Each map data element 430 may include link (or "segment") data (i.e., a stretch of road between two intersections where the link attributes remain the same), and/or node data (i.e., a connection point between road links). Link data may include, for instance, a link ID, link attributes (e.g., functional class, road type, posted speed limit, speed category, link length, etc.), link travel direction, link shape, from-node ID (i.e., identifier of a node at the beginning of the link), to-node ID (i.e., identifier of the node at the end of the link), driving restriction data (e.g., physical, logical, time restricted, etc.), and/or other sub-elements. Node data may include, for instance, a node ID, a set of connect-link IDs, and/or other sub-elements. Using this structure, node and link entities may be used to define a connected graph of a road network.

Each driving restriction data element may include, for instance, a restriction ID, node ID, from-link ID(s), to-link ID(s), restriction type(s), restriction attributes, and/or other sub-elements. Types of restrictions may include, for instance, turn restrictions, stop restrictions (e.g., traffic lights, stop signs, etc.), speed restrictions (e.g., posted speed limits, speeds for certain terrains and/or conditions, etc), traffic restrictions, weather restrictions, school-zone restrictions, construction restrictions, etc. Restriction attributes may include, for instance, specific data regarding certain driving restrictions (e.g., time period of the restriction, duration of the restriction, etc.).

Each event log data element 440 may include an event log ID, driver ID, vehicle profile ID, location, event type, event description, an optional sensor log, and/or other sub-elements. The location data may include, for instance, latitude, longitude, current speed, a vehicle's heading, link ID, which side of the road and/or which lane a vehicle is traveling in, a vehicle's distance from the beginning of the link, etc. The event log may store information regarding various driving events (e.g., turning hazards, exceeding posted speed limits, etc.).

Each driver log data element 450 may include a driver log ID, driver ID, vehicle profile ID, trip ID, vehicle sensor log, and/or other sub-elements. The driver log may store data regarding various driving trips (e.g., time traveled, distance traveled, possible warning events, gasoline and/or electricity consumed, etc.).

Each curve data element 460 may include a curve ID, and/or other sub-elements. Each other data element 470 may include various other types of useful data, which may include a particular ID, and/or other sub-elements.

One of ordinary skill in the art will recognize that the data structure diagram 400 is conceptual in nature and may be implemented in various different ways without departing from the spirit of the invention. For instance, various elements may be removed and/or various other elements may be included. In addition, multiple elements may be combined into a single element and/or a single element may be divided into multiple elements.

II. Curve-Based Reporting and/or Analysis

Some embodiments use curve-based representation of various driver characteristics. Each such curve may be represented as a set of value points or equations. Storage and comparison among various curves may be performed by a common system component. Curves may be associated with paths, which are described in more detail in Section III below. Example curves are described in more detail in Section VI below. Each curve may include multiple sections. Each section may be defined by a set of direct values or expressed as parameterized equations. Some embodiments may include a curve comparator that is able to compare one or more curves to each other and return statistics related to differences among the curves (e.g., minimum, maximum, average, etc.) as well as geometrical features of the difference.

Figure 5:
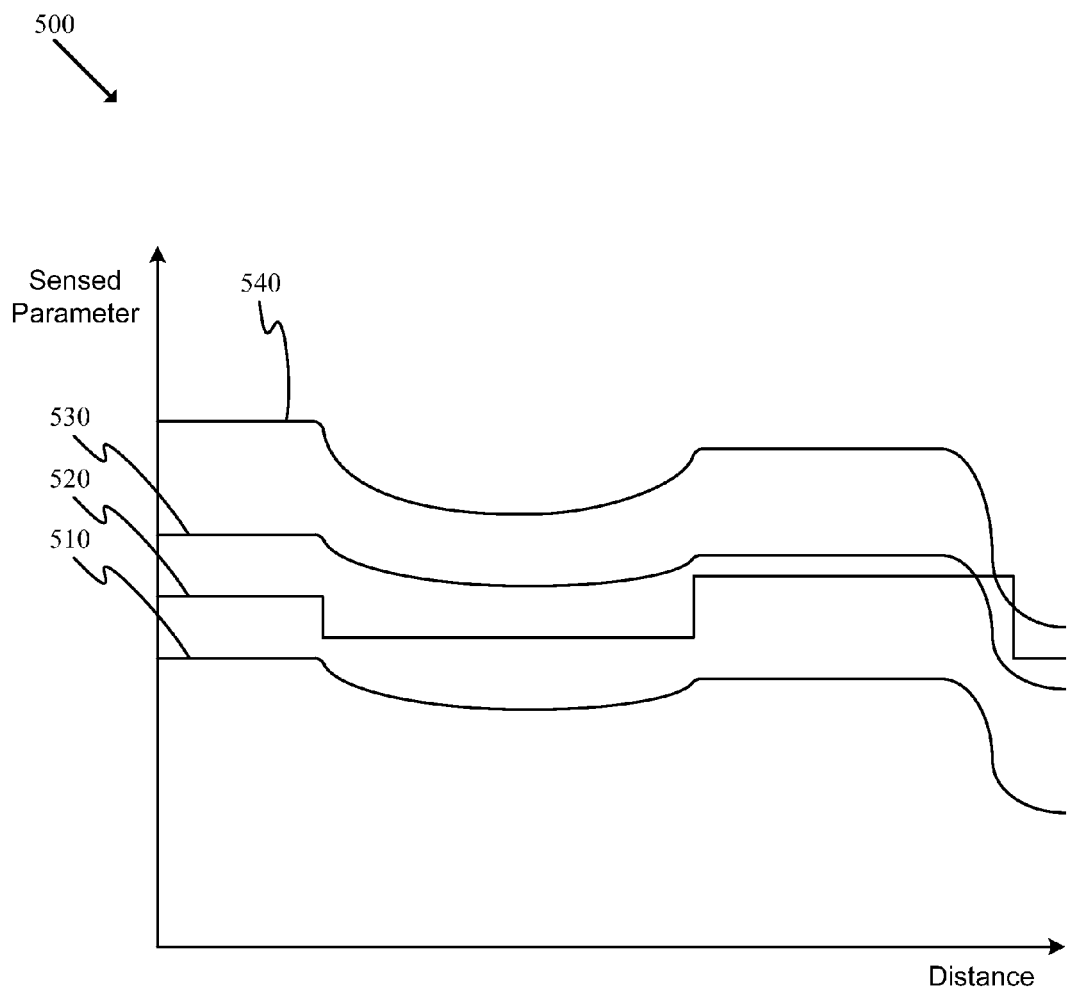
FIG. 5 illustrates an x-y plot with example performance evaluation curves according to some embodiments of the invention.

FIG. 5 illustrates an x-y plot 500 with example performance evaluation curves according to some embodiments of the invention. Specifically, this figure shows a set of reference curves that may be used to evaluate performance of a driver related to a specific sensed parameter. Such reference curves may be based on various factors such as posted, derived, average, or recommended speed attributes retrieved from a map database, vehicle characteristics, road curvature, intersections, traffic lights, and stop signs, weather conditions, slope, position of the accelerator control, and/or other appropriate factors.

As shown in FIG. 5, the x-y plot may include an optimum curve 510, a speed limit curve 520, a warning level curve 530, and a critical warning level curve 540. In the x-y plot of FIG. 5, distance is represented by the x-axis, and a sensed parameter is represented by the y-axis.

The optimum curve 510 may represent an optimum level for various sensed parameters (e.g., speed, acceleration, braking, yaw rate, fuel efficiency, etc.). For instance, such an optimal curve may represent the speed at which fuel efficiency is maximized. The speed limit curve 520 may represent the actual speed limit for a driving path. The warning level curve 530 may represent a warning level for various sensed parameters. For instance, the warning level curve may indicate various unsafe levels of speed, acceleration, braking, yaw rate, etc. The warning level curve may indicate a bottom level of various unsafe driving behaviors.

The critical warning level curve 540 may represent a critical warning level for various sensed driving parameters. The critical warning level curve may indicate an upper level of various unsafe driving behaviors. For instance, the critical warning level curve may indicate a level of various sensed driving parameters at which a driver may lose control of a vehicle, fail to keep a vehicle in its current lane, fail to maintain a safe stopping distance between other vehicles, fail to maintain a safe turning speed, etc.

During operation, an actual behavior (driving) curve (not shown) may be generated (e.g., based on a measured parameter of the vehicle) and compared to one or more of the evaluation curves 510-540. Such comparison may result in identification and quantifications of various differences among the curves.

One of ordinary skill in the art will recognize that curves 510-540 are conceptual in nature and may be implemented and/or represented in various different ways without departing from the spirit of the invention. For instance, various curves may have various parameters, limits, and/or other appropriate features. In addition, various other driving data may be utilized and/or included.

III. Path-Based Data and/or Analysis

Some embodiments may require accurate information regarding a current path and potential future path(s) of a vehicle. Thus, some embodiments provide a common and efficient way to represent such paths, while also reflecting probabilities associated with any future paths. Paths may be created for every deviation in a road network around a current position of the vehicle.

Figure 6:
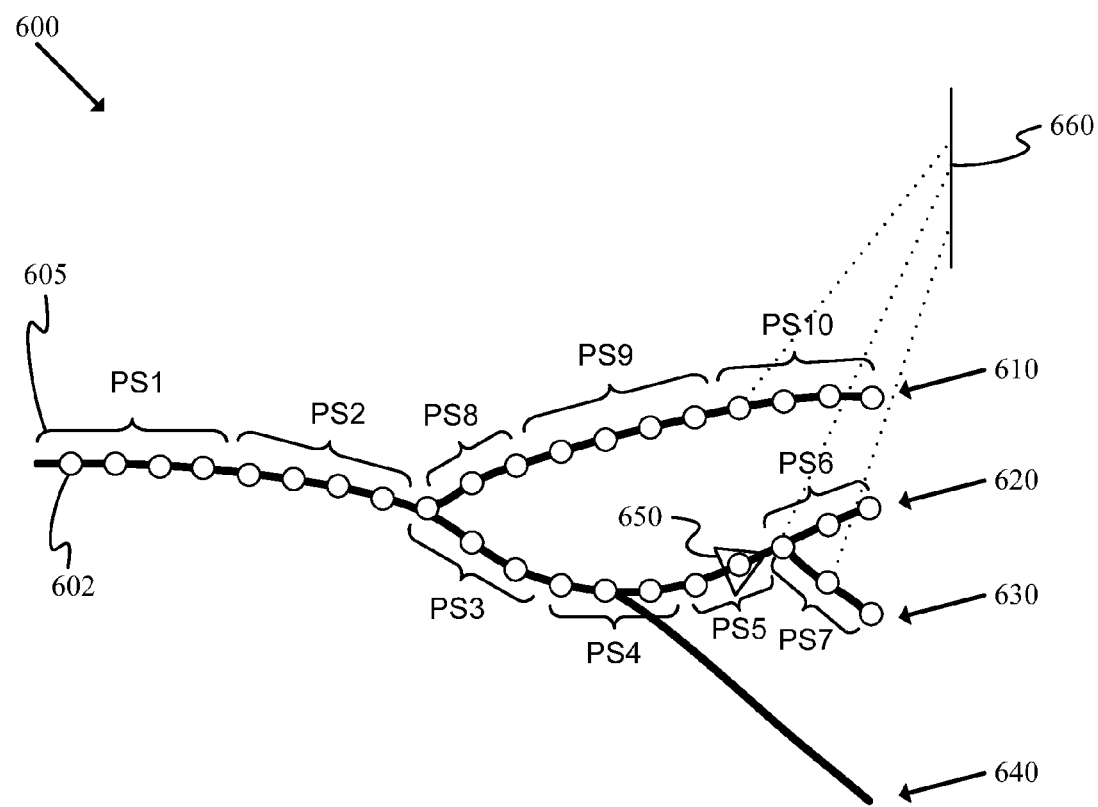
FIG. 6 illustrates an x-y plot with example vehicle paths according to some embodiments of the invention.

FIG. 6 illustrates an x-y plot 600 with example vehicle paths according to some embodiments of the invention. Specifically, this figure shows how a set of roadways (or waterways, or other navigable elements) may be defined as sets of points along the roadways. As shown, the plot includes multiple "points" 602, various "path sections" 605, several candidate paths 610-630, a non-candidate path 640, a current matched position 650, and possible future points 660, each with a different associated probability. In this diagram, paths are used to represent past vehicle positions and possible future positions.

Each path (e.g., each one of the example paths 610-640) represents a set of points 602 behind and ahead of the vehicle. Each path section 605 may include an associated set of points 602. In addition, each path (e.g., each one of the example paths 610-640) may include links to multiple path sections (e.g., a preceding section and multiple potential future sections). Common sections may be shared among paths. In some embodiments, each path section may include an equal number of points as each other path section. This allows for efficient storage in computer memory, because path sections may be shared among the paths and section objects may be quickly allocated and reused as the path sections are the same size. Paths may be generated for every deviation in a road network near the current vehicle position. For instance, a distinct path may be generated for each candidate path identified by a positioning engine. In addition, paths may be branched (i.e., new paths may be created) for upcoming roads that also have a high probability of being traveled over as determined by a path prediction engine.

Certain vehicle paths may be dropped as the path prediction engine determines probabilities associated with various candidate paths decrease below a configurable threshold. At the end of a driving session, there may be one continuous path that represents the points 602 where the vehicle has driven.

In the example in FIG. 6, path 610 is the least probable path the vehicle may take, path 620 is the most probable path the vehicle may take, and path 630 is more probable than path 610, but less probable than path 620. The non-candidate path 640 is not included as a possible future driving path because the probability associated with the non-candidate path is below a threshold value due to a heading and location that is improbable based on the current vehicle position and heading. The vehicle's current matched position 650 may be determined by the positioning engine 225 based on information received from the vehicle sensor module 255 and map data access module 220. The possible future driving points 660 may be determined from the driver behavior engine 205, based on information received from the map data access module 220, positioning engine 225, path prediction engine 230, and vehicle sensor module 255.

Path 620 includes past driving points, current vehicle position 650, and future driving points. Path 630 is a future probable driving path that partially overlaps path 620. Path 610 is a probable driving path as determined from the driver behavior engine 205, based on information received from the map data access module 220, positioning engine 225, path prediction engine 230, and vehicle sensor module 255.

Driving points 602 may be grouped into various path sections 605. A vehicle path section may represent a fixed number of driving points 602 on the same map link. For any new link, a new path section 605 may be created. Also, if a maximum number of points 602 allowed per path section 605 is reached, a new path section may be created. A vehicle path may include multiple path sections, and different paths may share path sections between each other.

As illustrated in FIG. 6, for simplicity, path sections are limited to four points. Different paths may typically share many of the same points, which may allow minimization of memory usage and efficient processing. As shown, path 620 includes path sections PS1-PS6, path 630 includes path sections PS1-PS5, and PS7, and path 610 includes path sections PS1, PS2, PS8, PS9, and PS10. Section PS5 is incomplete with only two nodes because of the current matched position 650 of the vehicle, and the possible future points shown in sections PS6 and PS7. As the vehicle travels, new driving points may be added to the vehicle paths, which may result in points being added to the current path section and/or predicted path sections, and/or old driving points may be removed from the past path sections. If a given path section is full, a new section may be added. If the driver behavior engine 205 is used only for post-analysis the vehicle paths may not include any future driving points and sections.

One of ordinary skill in the art will recognize that the diagram 600 is conceptual in nature and may be implemented in various different ways without departing from the spirit of the invention. For instance, different embodiments may include different numbers of points in each section, and/or different numbers of sections along each path. In addition, different embodiment may include different numbers of possible future paths depending on various relevant factors (e.g., features of the available roadway(s), driver history, etc.).

IV. Probabilistic Weighting of Events and Path Prediction

During operation, a vehicle may be presented with various different potential paths (e.g., a driver may leave one roadway to enter another roadway, a driver may change lanes along a roadway, etc.). Some embodiments may quantify the probability that any potential path will actually be followed. Such probabilities may be used to predict which potential path will be taken and/or to provide probabilistic weighting of potential events (e.g., a warning event).

Figure 7:
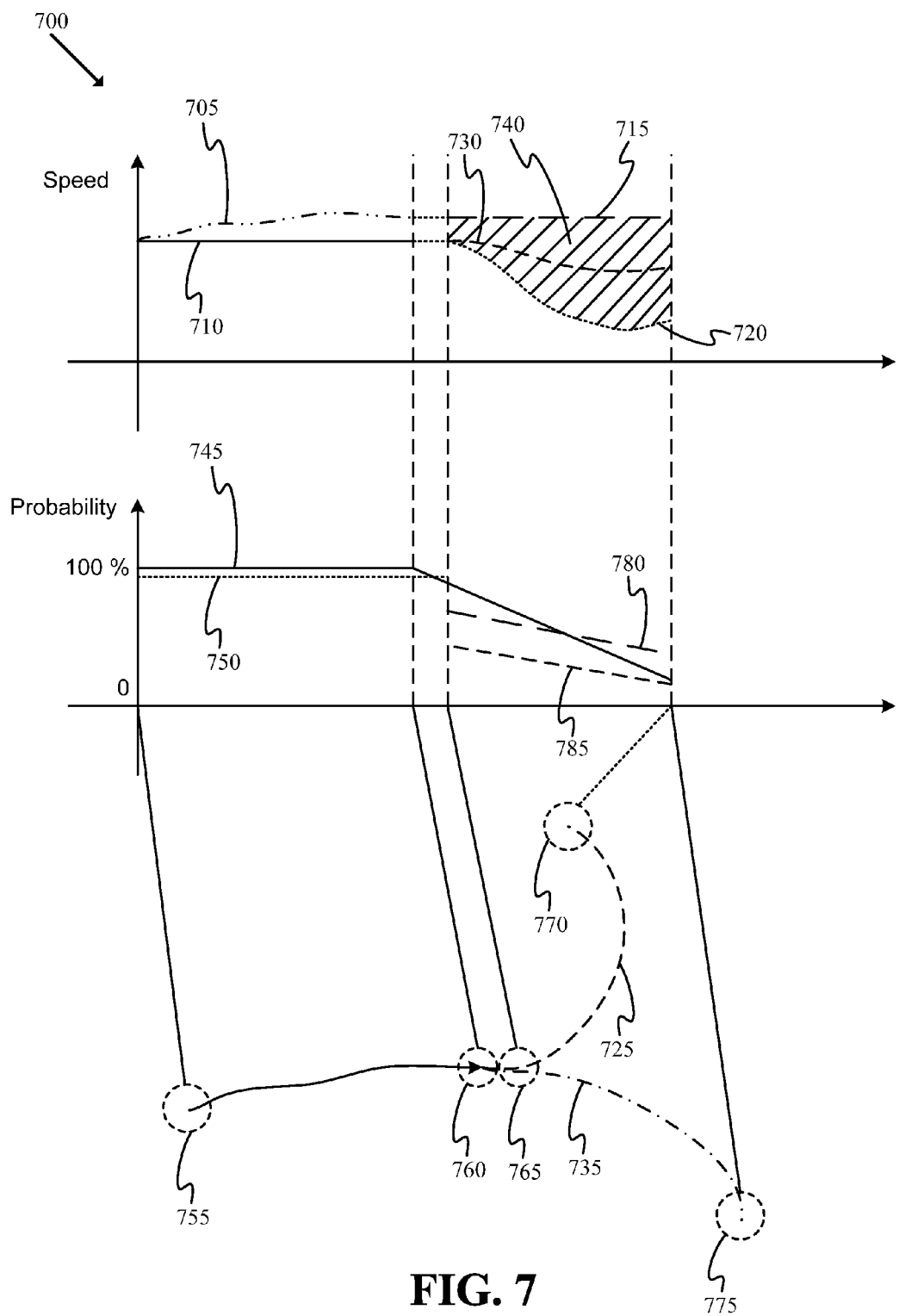
FIG. 7 illustrates an x-y plot with predicted paths and associated probability and speed curves provided by some embodiments of the invention.

FIG. 7 illustrates an x-y plot 700 with predicted paths and associated probability and speed curves provided by some embodiments of the invention. Specifically, this figure shows how probabilistic weighting may be used to monitor and/or evaluate driver performance. As shown, the x-y plot includes an actual driving speed curve 705, a safe speed curve 710, a predicted driving speed curve 715, a predicted safe speed curve 720 for a first potential path 725, a predicted safe speed curve 730 for a second potential path 735, an unsafe speed zone (area) 740, a current speed probability curve 745, a safe speed probability curve 750, various points 755-775 along the potential driving paths 725 and 735, and predicted probability curve sections 780 and 785 associated with the potential paths 725 and 735, respectively.

The driving speed curve 705 may indicate the actual speed of a vehicle. The data included in the actual speed curve may be measured by various appropriate elements (e.g., vehicle sensors 120). The safe speed curve 710 may indicate a safe speed for a vehicle to travel based on the associated geographical location. The associated geographical location may be matched to road links, which may be retrieved from various appropriate components (e.g., map database 215 via positioning engine 225).

The predicted driving speed curve 715 may indicate the predicted speed of a vehicle. The predicted driving speed curve may be at least partly based on various appropriate factors (e.g., current measured speed of the vehicle, acceleration/deceleration, map attributes, information received from various sensors, etc.). The predicted safe speed curve 720 and the predicted safe speed curve 730 may indicate predicted safe speeds for vehicles traveling on path 725, and path 735, respectively. The predicted safe speed curves for paths 725 and 735 may be determined at least partly based on vehicle characteristics, map attributes (including road curvatures, road inclines/declines, road tilt, road surface, etc.), posted speed limits, weather conditions, and/or other appropriate factors.

The unsafe speed zone 740 may indicate areas where the actual speed of the vehicle exceeds one or more safe speed thresholds defined by one or more safe speed curves (e.g., curves 720 and 730). The size of an unsafe speed zone (and/or any other characteristic that exceeds a threshold) may be determined and may be used to quantify various aspects of driver performance. For instance, an unsafe speed zone that is caused by a driver exceeding a threshold by a minimal amount for a long time (e.g., driving a few miles over a speed limit for an extended time) may be weighted less than an unsafe speed zone of the same size that is caused by a driver exceeding a threshold by a large amount for a short time (e.g., failing to recognize a stop sign at a reasonable distance and coming to a skidding stop past an associated stop line). The geometrical area between a safety curve and a behavior curve may indicate the severity of a driving event and based on the severity, the system may determine whether a warning signal should be issued. The severity of such a driving event may also be weighted with the probability of such occurrence when determining whether to issue a warning. For instance, a relatively high probability of a minor event (e.g., exceeding the speed limit by 2 mph) may not trigger a warning, while a relatively low probability of a major event (e.g., approaching a road with high curvature at high speed) may trigger a warning.

The current speed probability curve 745 may indicate the probability of continuing to drive at the current speed based on one or more potential future paths of the vehicle (and/or other relevant factors). The current speed probability curve may be at least partly based on data received from various system elements (e.g., path prediction engine 230). For instance, one or more components may identify and retrieve possible paths from a map database (or data element) based on the current vehicle position. Such possible paths may be identified to a set distance (e.g., a default distance, a user-defined distance, a dynamically-calculated distance, and/or otherwise appropriately determined distance). The safe speed probability curve 750 may indicate probabilities of driving at a safe speed depending on the potential paths a vehicle may take (and/or the probability associated with each path).

The various points 755-775 along the driving paths 725 and 735 may correlate with actual physical locations along a roadway, and associated with points along the actual speed curve 705, safe speed curve 710, predicted speed curve 715, predicted safe speed curves 720 and 730, current speed probability curve 745, and safe speed probability curve 750. In this example, point 755 represents a past position of the vehicle. Information related to this past position (e.g., vehicle speed, safe speed, etc.) may be used to determine various future characteristics of the vehicle (e.g., potential path probability, safe speed, etc.). Point 760 represents a current position of the vehicle. Thus, vehicle characteristics such as actual speed are known up to point 760 at least as far back as point 755. Point 765 represents a divergence to two potential paths 725 and 735. Such a point may be, for instance, an intersection, off-ramp, onramp, and/or other appropriate point where multiple future paths may be available. Points 770 and 775 represent potential future positions of the vehicle, depending on which path 725 or 735 the vehicle takes. The various potential future positions may be on different roadways, may be along different directions on the same roadway, and/or may otherwise include various potential locations available to the vehicle.

During operation, some embodiments may continuously and/or periodically evaluate multiple possible map paths based at least partly on the current vehicle position. As shown in the example in FIG. 7, there could be two potential paths 725 and 735 that a vehicle may travel. Each path may have an associated probability that may be determined based on the current vehicle position, information received from various vehicle sensors, and/or other relevant factors. For example, one or more vehicle sensors may determine that the driver of the vehicle has activated a left turn indicator, which may result in a determination of a higher probability of turning left than right. As another example, a vehicle may follow a route from a navigation system, which may result in a determination of a higher probability of taking a path which is along the route provided by the navigation system. As another example, the path prediction engine may use the knowledge of the current lane the vehicle is on to determine the probability of turning right or left.

One of ordinary skill in the art will recognize that the diagram 700 is conceptual in nature and may be implemented in various different ways without departing from the spirit of the invention. For instance, various parameters may be removed and/or various other parameters may be included. Furthermore, various other driving data may be utilized and/or included.

V. Methods of Operation

Figure 8:
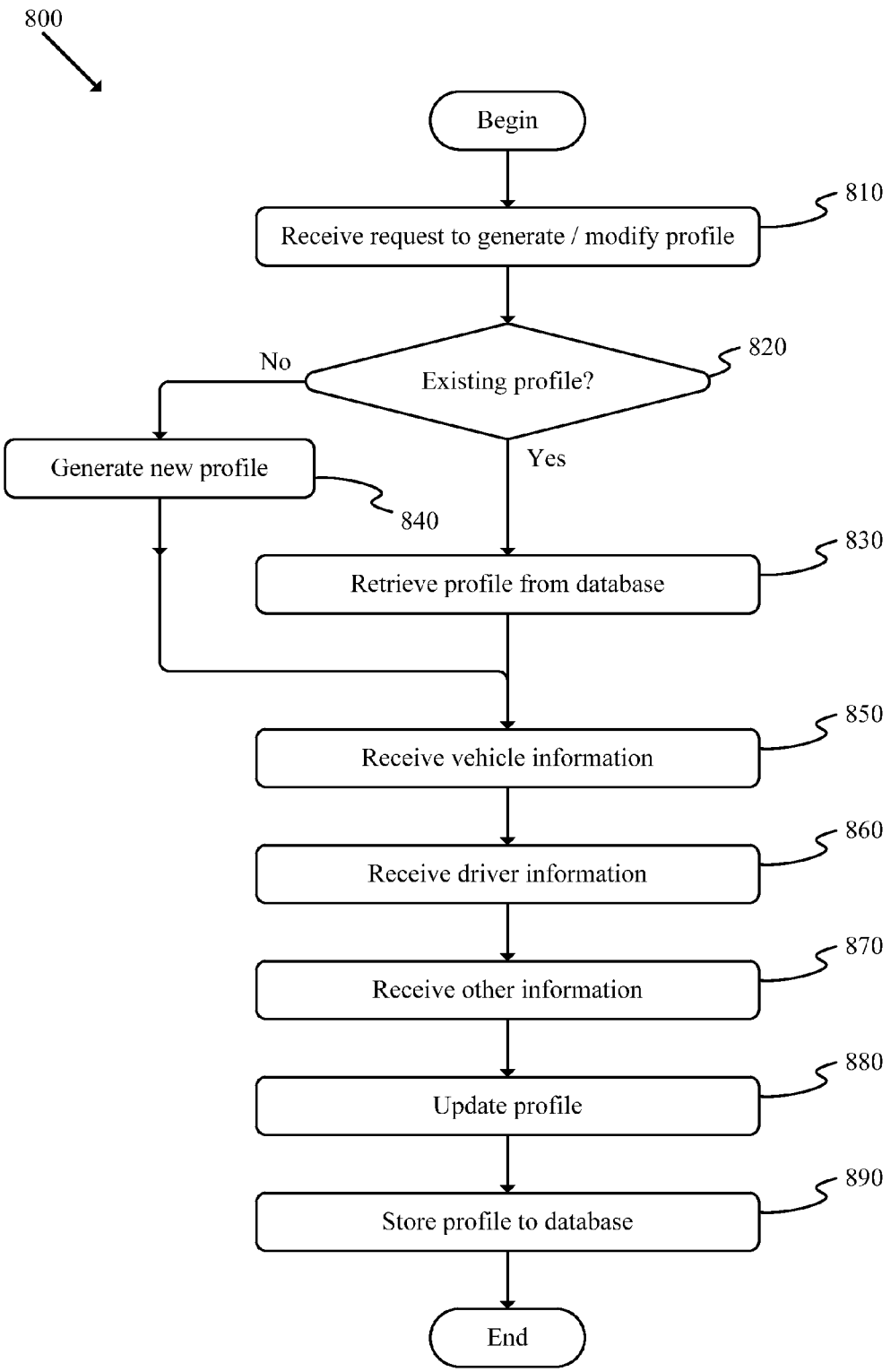
FIG. 8 illustrates a flow chart of a conceptual process used by some embodiments of the invention to generate and/or modify a profile.

FIG. 8 illustrates a flow chart of a conceptual process 800 used by some embodiments of the invention to generate and/or modify a profile. The process may begin, for instance, when a user first configures the system, when a new driver is added to an existing vehicle, when a new vehicle is associated with an existing driver, and/or at other appropriate times.

Next, the process may receive (at 810) a request to generate and/or modify a profile. Such a request may be received in various appropriate ways (e.g., a user may make a selection using a user interface, may update data associated with a system, etc.). Such a profile may include information about one or more vehicles, one or more drivers, and/or various driving applications. The process may then determine (at 820) whether or not there is an existing profile. Such a determination may be made by retrieving data from a profile database of some embodiments. If the process determines (at 820) that a profile already exists, the process may then retrieve (at 830) the profile from the database. If the process determines (at 820) that the requested profile does not exist, the process may generate (at 840) a new profile.

After either retrieving (at 830) the profile from the profile database, or generating (at 840) a new profile, process 800 may then receive (at 850) vehicle information. Such information may include the vehicle type and various vehicle characteristics such as vehicle size, vehicle dimensions, turning radius, engine power, vehicle handling, braking power, tire type, etc. The process may then receive (at 860) driver information. Such information may include driver age, driver size and weight, driving skills, previous driving events, etc. Next, the process may receive (at 870) any other appropriate information. The information may be received at 850-870 in various appropriate ways (e.g., a user may enter data into a user interface, a file having a particular format may be uploaded to a server or database, etc.).

Process 800 may then update (at 880) the profile with the received information. The process may then store (at 890) the profile to a database. After storing (at 890) the profile to the database, the process may end.

One of ordinary skill in the art will recognize that process 800 is conceptual in nature and may be implemented in various different ways without departing from the spirit of the invention. For instance, the operations may be performed in different orders. As another example, various operations may be omitted and/or other operations may be included. Furthermore, the process may be executed as part of a larger macro-process, and/or divided into multiple sub-processes. Moreover, the process may be executed continuously, at regular intervals, based on certain criteria, and/or in other appropriate ways.

Figure 9:
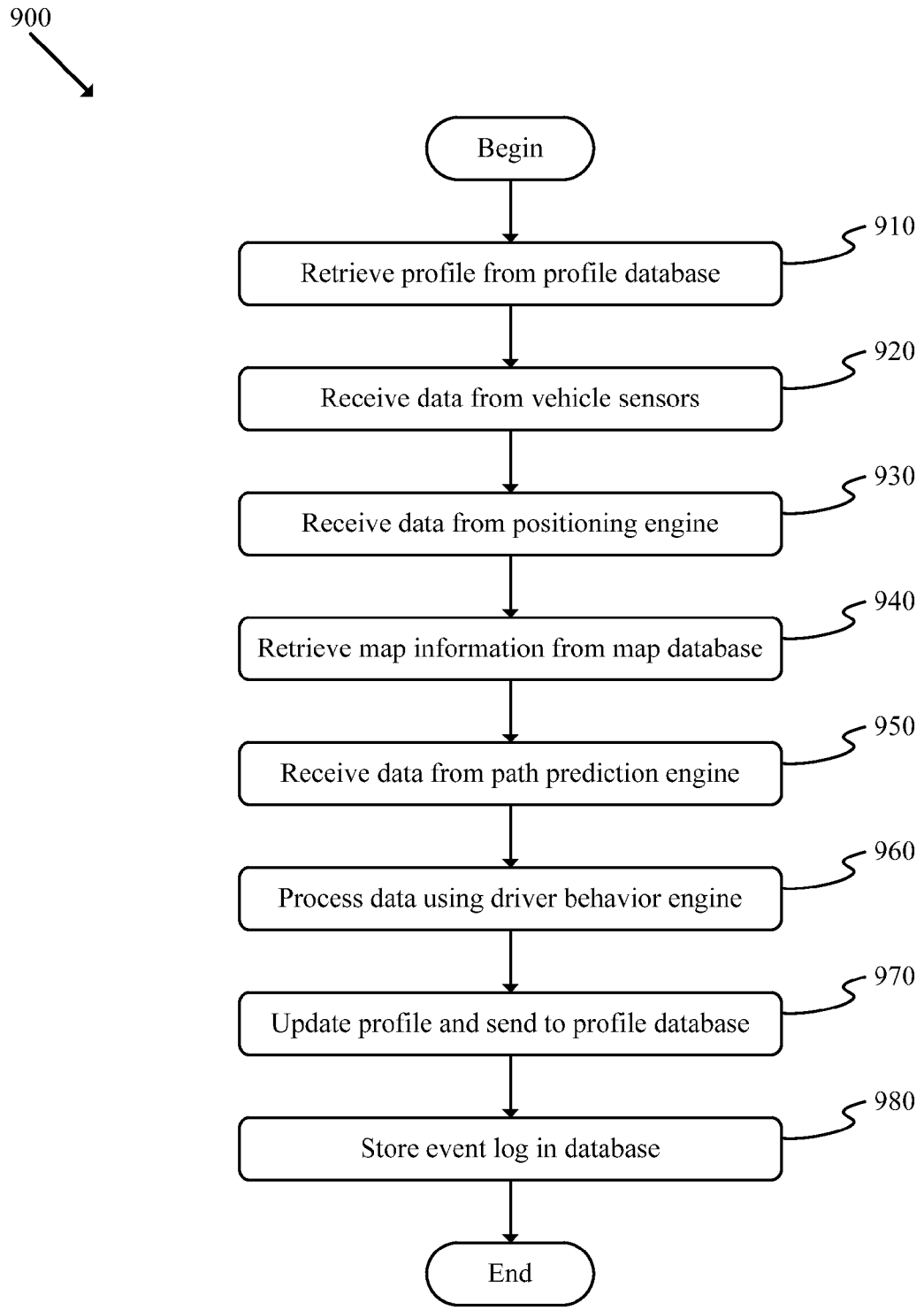
FIG. 9 illustrates a flow chart of a conceptual process used by some embodiments of the invention to collect and store data during vehicle operation.

FIG. 9 illustrates a flow chart of a conceptual process 900 used by some embodiments of the invention to collect and store data during vehicle operation. The process may begin, for instance, when a vehicle with a driver behavior engine is turned on.

The process may then retrieve (at 910) a profile from a profile database. Such a profile may include information about the vehicle, user, and/or the driving application (e.g., commuting, travel, commercial delivery, etc.). Next, process 900 may receive (at 920) data from various vehicle sensors. Such data may include speed, acceleration, yaw rate, etc. The process may then receive (at 930) data from a positioning engine. Such data may include a vehicle position along a path and a list of potential paths associated with the current position. Such data may be at least partly based on the vehicle sensor data (e.g., GPS data) received at 920. The process may then retrieve (at 940) map information from a map database. Such map information may be at least partly based on the vehicle sensor data received at 920 and/or the data received at 930 from the positioning engine. Next, the process may receive (at 950) data from a path prediction engine. Such data may include a probability associated with each potential path.

Process 900 may then process (at 960) the retrieved and/or received data using a driver behavior engine (and/or other appropriate system components). Such processing may include comparing the data to various thresholds (e.g., speed limits, safe operating speeds, etc.), evaluating the data relative to an optimal performance standard (e.g., determining deviations from a speed curve associated with optimal gas mileage), and/or other appropriate processing (e.g., data smoothing and/or filtering, gain adjustments, etc.). Next, the process may update (at 970) the profile and send the updated profile to the profile database. The process may then store (at 980) an event log in an event log database. The event log may include data related to driving events and driving characteristics such as position, speed, acceleration, yaw rate, etc. Such an event log may include sets of data points associated with particular positions, increments of time, etc. After storing (at 980) the event log in the database, the process may end.

One of ordinary skill in the art will recognize that process 900 is conceptual in nature and may be implemented in various different ways without departing from the spirit of the invention. For instance, the operations may be performed in different orders. As another example, various operations may be omitted and/or other operations may be included. Furthermore, the process may be executed as part of a larger macro-process, and/or divided into multiple sub-processes. Moreover, the process may be executed continuously, at regular intervals, based on certain criteria, and/or in other appropriate ways.

Figure 10:
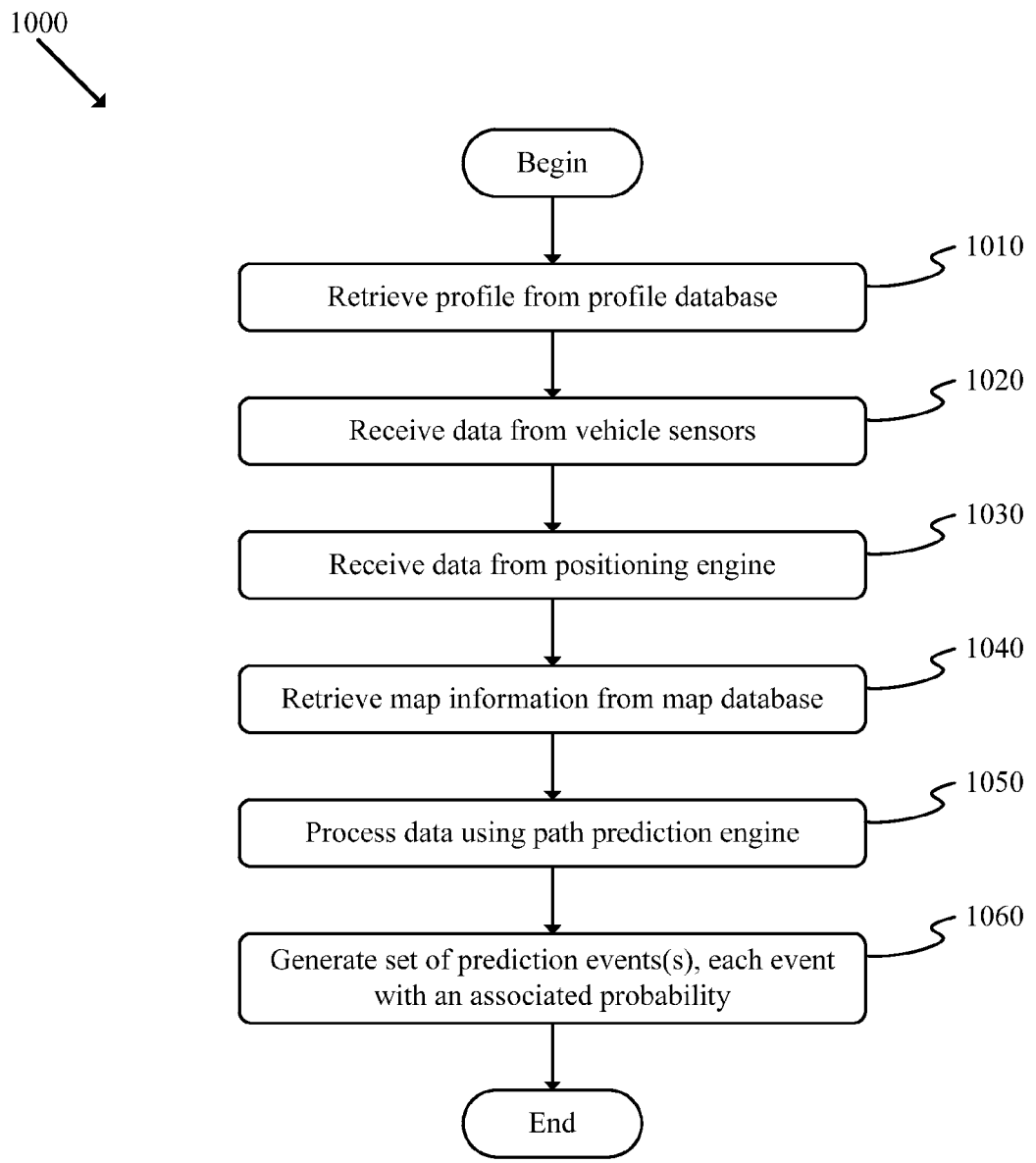
FIG. 10 illustrates a flow chart of a conceptual process used by some embodiments of the invention to generate a set of prediction events with associated probabilities.

FIG. 10 illustrates a flow chart of a conceptual process 1000 used by some embodiments of the invention to generate a set of prediction events with associated probabilities. The process may begin, for instance, when a vehicle with a driver behavior engine of some embodiments is turned on.

The process may then retrieve (at 1010) a profile from a profile database. Such a profile may include information about one or more vehicles, users, and/or driving applications. Process 1000 may then receive (at 1230) data from vehicle sensors. Such data may include speed, acceleration, yaw rate, etc. The process may then receive (at 1030) data from a positioning engine. Such data may include a vehicle's position on a road and may be based at least partly on the data received from one or more vehicle sensors. Next, the process may retrieve (at 1040) map information from a map database. The retrieved information may be at least partly based on data received from the vehicle sensors and/or from the positioning engine. Next, the process may process (at 1050) data using a path prediction engine to determine various prediction data. Such prediction data may include probabilities associated with different potential paths, probabilities of different driver behaviors, and/or other predicted data and may be based at least partly on the retrieved map information, received vehicle sensor data, and/or data received from the positioning engine.

Process 1000 may then generate (at 1060) a set of prediction events, with each event having an associated probability. Such events may include data related to predicted paths, speeds, potential collisions, unsafe driving maneuvers, etc. After generating (at 1060) the set of prediction events, the process may end.

One of ordinary skill in the art will recognize that process 1000 is conceptual in nature and may be implemented in various different ways without departing from the spirit of the invention. For instance, the operations may be performed in different orders. As another example, various operations may be omitted and/or other operations may be included. Furthermore, the process may be executed as part of a larger macro-process, and/or divided into multiple sub-processes. Moreover, the process may be executed continuously, at regular intervals, based on certain criteria, and/or in other appropriate ways.

Figure 11:
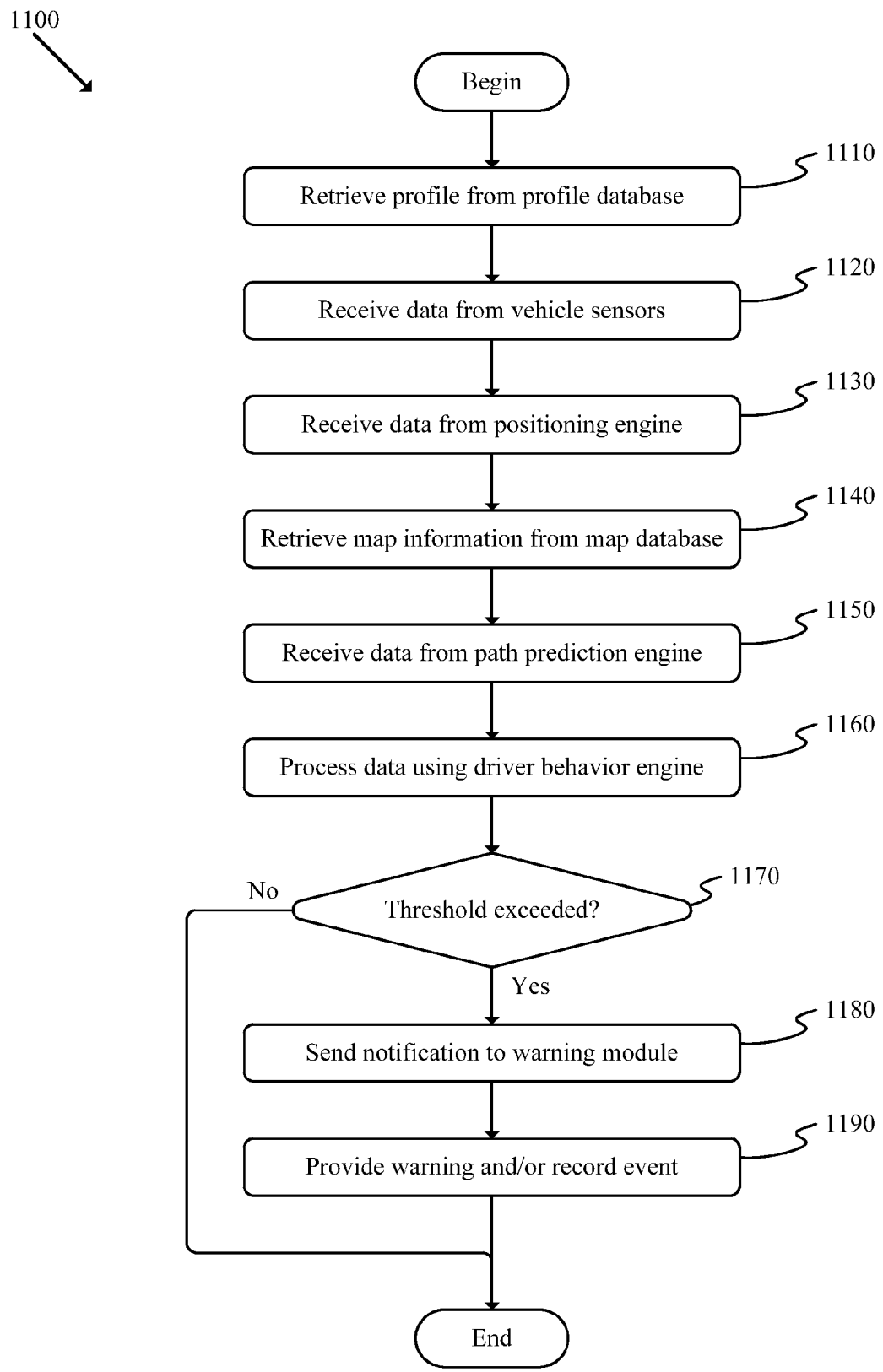
FIG. 11 illustrates a flow chart of a conceptual process used by some embodiments of the invention to provide a warning.

FIG. 11 illustrates a flow chart of a conceptual process 1100 used by some embodiments of the invention to provide a warning. The process may begin, for instance, when a vehicle with a driver behavior engine is turned on.

The process may then retrieve (at 1110) a profile from a profile database. Such a profile may include information about one or more vehicles, users, and/or driving applications. Process 1100 may then receive (at 1120) data from various vehicle sensors. Such data may include speed, acceleration, yaw rate, etc. Next, the process may receive (at 1130) data from a positioning engine. Such data may include a geographic position of the vehicle and may be based at least partly on the data received from the vehicle sensors.

The process may then retrieve (at 1140) map information from a map database. Such map information may be retrieved at least partly based on the relevance of the information to the geographic position of the vehicle and/or data received from the vehicle sensors. Next, the process may receive (at 1150) data from a path prediction engine. Such data may include probabilities of taking different paths, and probabilities of different driver behaviors.

Process 1100 may then process (at 1160) the received and/or retrieved data using a driver behavior engine. Such processing may include generation of behavior curves, predicted speed curves, actual speed curves, and/or any other appropriate data elements. The process may then determine (at 1170) whether a threshold has been exceeded. Such a threshold may be associated with various appropriate elements (e.g., an optimum speed curve, a speed limit curve, an unsafe speed curve, a critical speed curve, etc.) based on various appropriate parameters (e.g., speed, acceleration, etc.). The determination of whether a threshold has been exceeded may be based on various mathematical comparisons between the received and/or retrieved data and a set of thresholds that may be associated with the retrieved profile.

If the process determines (at 1170) that a threshold has been exceeded, the process may then send (at 1180) a notification to a warning module. Next, the process may provide (at 1190) a warning to an operator of the vehicle (e.g., by sounding an alarm, activating a display element, etc.) and/or record (at 1190) the warning event to a server. After providing and/or recording (at 1190) the warning event, or after determining (at 1170) that a threshold has not been exceeded, the process may end.

One of ordinary skill in the art will recognize that process 1100 is conceptual in nature and may be implemented in various different ways without departing from the spirit of the invention. For instance, the operations may be performed in different orders. As another example, various operations may be omitted and/or other operations may be included. Furthermore, the process may be executed as part of a larger macro-process, and/or divided into multiple sub-processes.

Moreover, the process may be executed continuously, at regular intervals, based on certain criteria, and/or in other appropriate ways.

Figure 12:
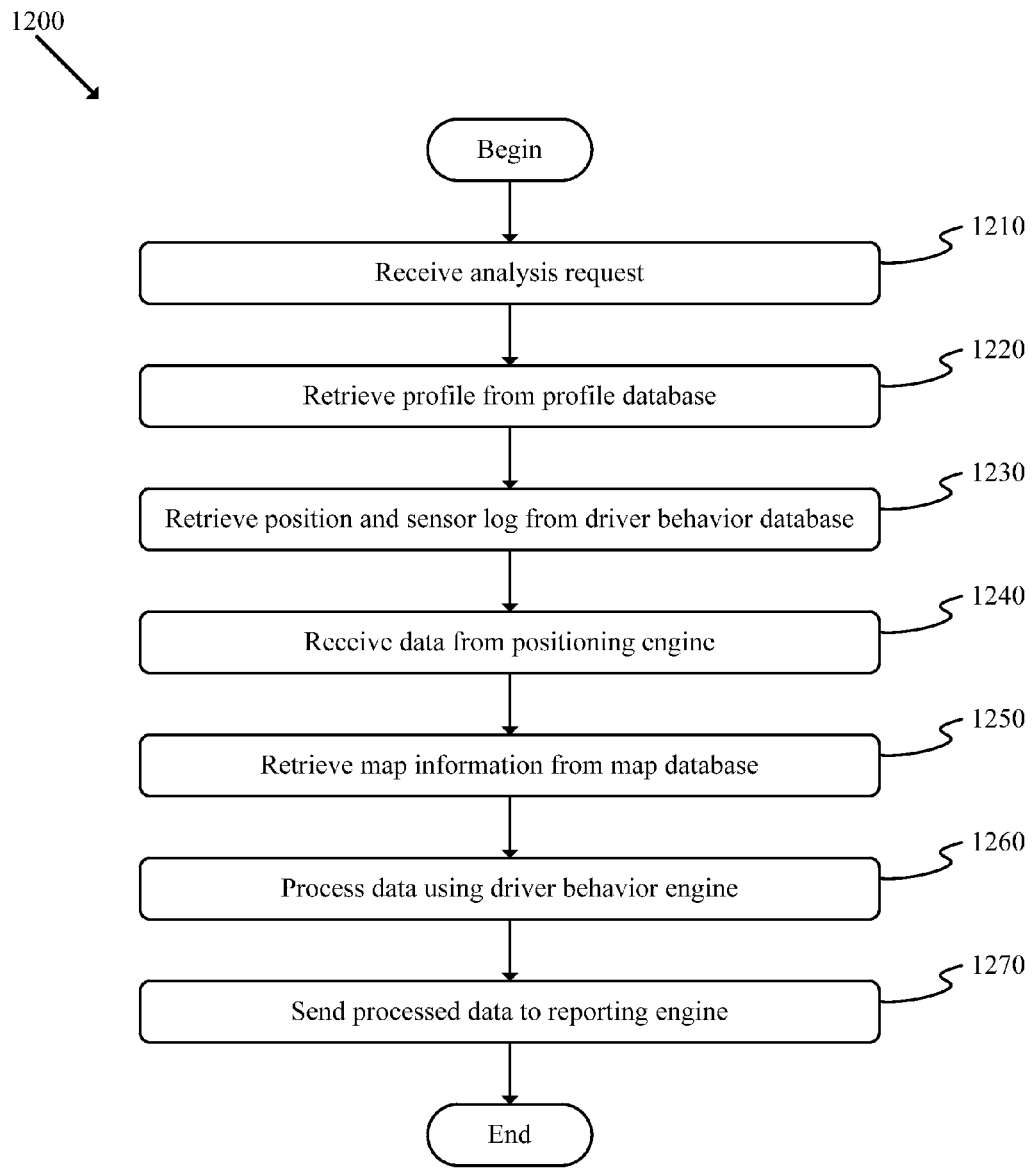
FIG. 12 illustrates a flow chart of a conceptual process used by some embodiments of the invention to allow offline analysis of driver behavior.

FIG. 12 illustrates a flow chart of a conceptual process 1200 used by some embodiments of the invention to allow offline analysis of driver behavior. The process may begin, for instance, when a user accesses a server of some embodiments (e.g., when a user launches an analysis application of some embodiments). Such a user may be a driver evaluating her own performance, a parent evaluating the performance of a teenage driver, a manager evaluating the performance of one or more drivers in a fleet of vehicles, an electronic entity capable of communicating with the system of some embodiments, and/or other appropriate entities.

The process may then receive (at 1210) an analysis request. Such a request may be received in various appropriate ways (e.g., from a user interface module, as sets of data and/or instructions that are able to be interpreted by the server and/or application, web services request, etc.). Next, the process may retrieve (at 1220) a profile from a profile database. Such a profile may include information about one or more vehicles, users, and/or driving applications that may be analyzed. Process 1200 may then retrieve (at 1230) position and sensor log data from a driver behavior database. Such log data may include information such as vehicle position, sensor readings, etc., where the data elements are associated with various points along a path of the vehicle.

Next, the process may receive (at 1240) data from a positioning engine. Such data may include a vehicle's position. The process may then retrieve (at 1250) map information from a map database. Such map information may be associated with the received position information (e.g., sections of a map that are within a particular radius of the position of the vehicle, as determined by the positioning engine, may be retrieved). Process 1200 may then process (at 1260) data using a driver behavior engine. The process may then send (at 1270) the processed data to a reporting engine such that it is made available to the user analyzing the driver behavior. After the process sends (at 1270) processed data to the reporting engine, the process may end.

One of ordinary skill in the art will recognize that process 1200 is conceptual in nature and may be implemented in various different ways without departing from the spirit of the invention. For instance, the operations may be performed in different orders. As another example, various operations may be omitted and/or other operations may be included. Furthermore, the process may be executed as part of a larger macro-process, and/or divided into multiple sub-processes. Moreover, the process may be executed continuously, at regular intervals, based on certain criteria, and/or in other appropriate ways.

VI. Example Behavior Curves

The following section describes various example behavior curves. Such curves may have different numbers of nodes, sections, and/or other attributes. The curves may be used to evaluate any measurable parameter related to operation of a vehicle.

Figure 13:
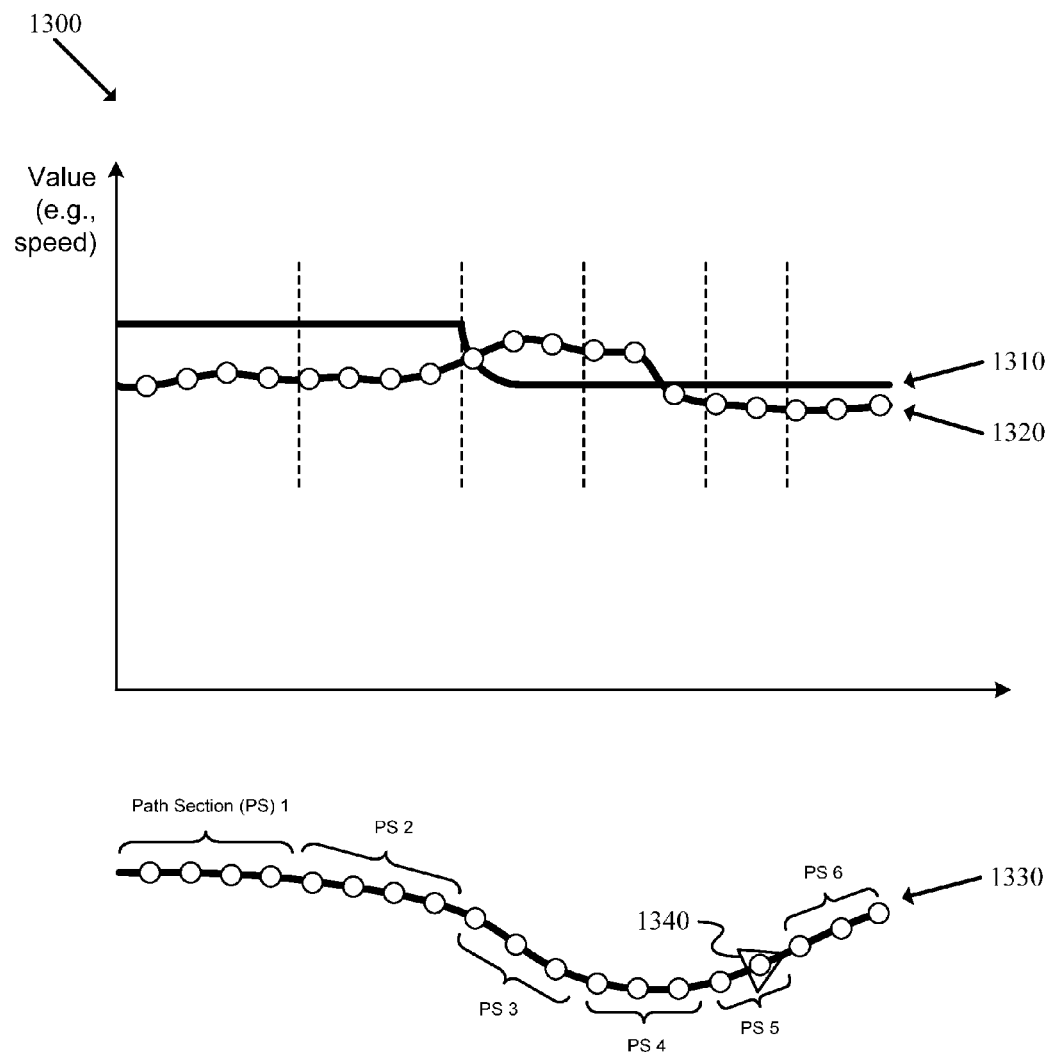
FIG. 13 illustrates an x-y plot with example behavior curves according to some embodiments of the invention.

FIG. 13 illustrates an x-y plot 1300 of example behavior curves according to some embodiments of the invention. Specifically, this figure shows associations among driver evaluation curves and driving path(s). As shown, the plot includes a reference curve 1310, a driver behavior curve (drive curve) 1320 with actual and predicted points, and a vehicle driving path 1330 with actual and predicted points.

The reference curve 1310 and driver behavior curve 1320 are matched with the vehicle path 1330. In other words, the various points along curves 1310 and 1320 correspond to the nodes along path 1330. The curves 1310-1320 represent data points of some observable driver characteristic for every measured point along the associated vehicle path 1330. For instance, the example in FIG. 13 shows a behavior curve 1320 represented by data points for driving speed (other behavior curves may represent other driving characteristics such as braking, turning, acceleration, fuel efficiency, etc.).

Reference curve 1310 and behavior curve 1320 may include curve sections (indicated by vertical dashed lines) associated with vehicle path 1330 sections (indicated by groupings of points). The curves 1310-1320 may be divided into the same sections as the associated vehicle path 1330, and for every vehicle point there may be a corresponding actual or potential curve value. Curve section values may be stored differently in different embodiments. For instance, curves may include a point for every vehicle point, or the curve value may be represented via some equation (linear, Bezier, etc.).

Representation of various driving characteristics as behavior curves allows continuous, efficient monitoring, recording, and/or analysis of driver behavior. In different embodiments, there may be many different types of curves that may each be represented as a set of value points and/or equations. A common curve module may be used to store and compare different curves, and may provide a curve data management infrastructure to manage different types of curves.

Figure 14:
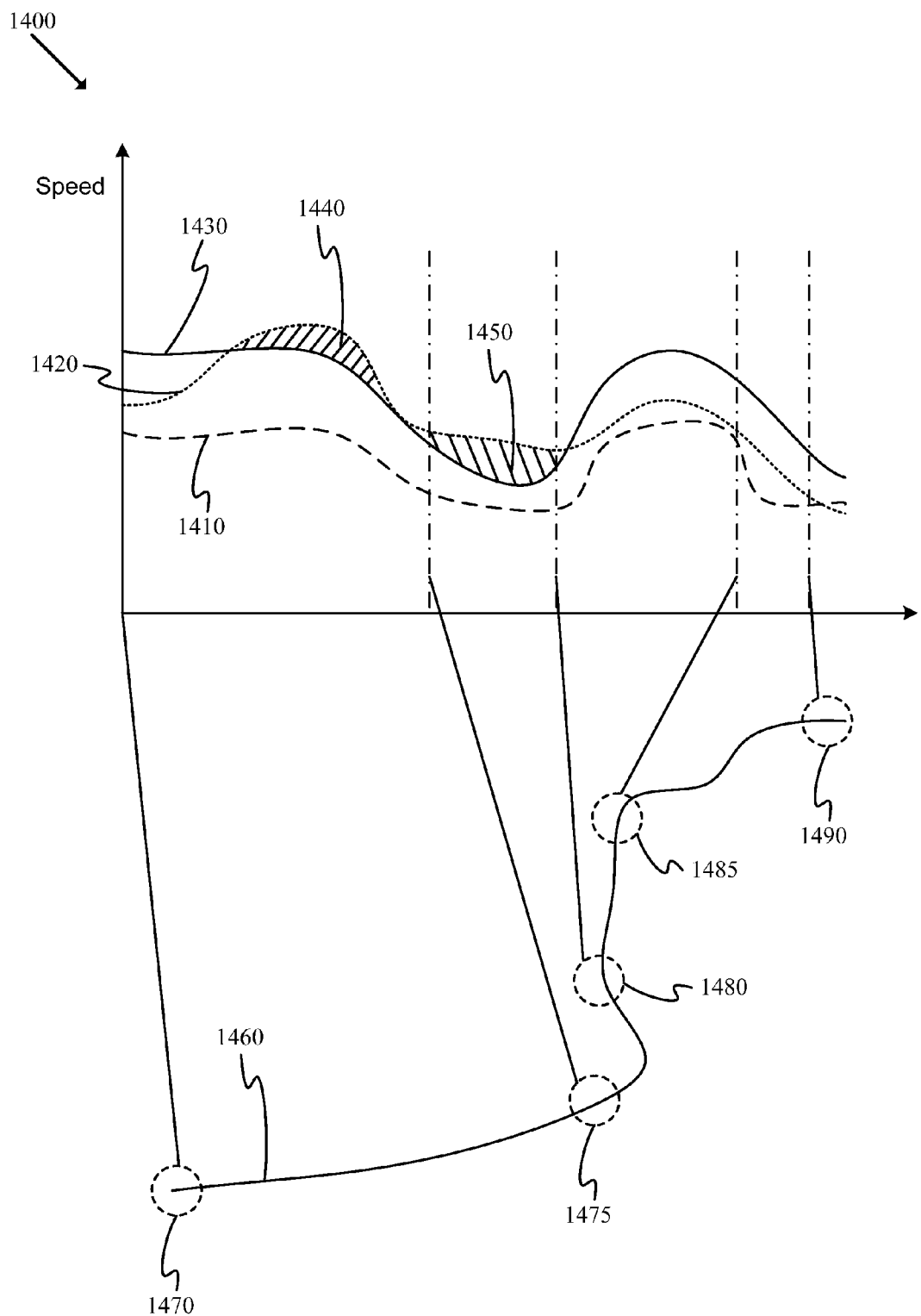
FIG. 14 illustrates an x-y plot with example speed curves according to some embodiments of the invention.

FIG. 14 illustrates an x-y plot of example speed curves 1400 according to some embodiments of the invention. Specifically, this figure shows speed curves over distance or time as a vehicle moves along a path. As shown, the x-y plot includes an optimal speed curve 1410, an actual speed curve 1420, a safe speed curve 1430, a speed violation zone 1440, an unsafe turning speed zone 1450, a vehicle path 1460, and various points 1470-1490 along the vehicle path 1460.

The optimal speed curve 1410 may indicate an optimal speed for a vehicle along the path 1460. The optimal speed curve 1410 may define the best expected values from monitored driving characteristics. Optimal speed curves may be used to guide driving performance over a range of conditions. Optimal speed curves may be used to optimize fuel efficiency, drive-time, etc. The actual speed curve 1420 may indicate the actual speed of a vehicle. The actual speed curve may be measured by appropriate vehicle sensors.

The safe speed curve 1430 may indicate a safe speed for a vehicle to travel based on geographic location, anticipated conditions and/or events, etc. The geographic location of the vehicle may be matched to road segments or path sections as determined by a component such as positioning engine 225 based on data retrieved from a component such as map database 215. The safe speed curve 1430 may define bounds for which a safety alert may be issued. For instance, if a given behavior curve crosses or exceeds a safety curve during operation of the vehicle, a warning may be given and/or recorded. Some embodiments of the invention may include multiple safety curves with different severity levels.

The speed violation zone 1440 may indicate unsafe speeds for a vehicle to travel based on a comparison of the actual speed curve 1420 to the safe speed curve 1430. Likewise, the unsafe turning speed zone 1450 may indicate unsafe turning speeds based on a comparison of the actual speed curve 1420 to the safe speed curve 1430 at a location along the path 1460 identified as a curve (and/or other appropriate feature which may depend on particular driver behavior(s) being evaluated). Driver behavior may be monitored, recorded, and/or analyzed at least partly based on specific shapes and/or sizes of such violation zones.

The vehicle path 1460 may be determined using various system resources (e.g., elements of the systems described above in reference to FIGS. 1-3). The path 1460 may be defined to include various elements such as the points and sections described above in reference to FIG. 6 and FIG. 13.

In the example in FIG. 14, speed values are shown for the given vehicle path 1460. Each point on the vehicle path may correspond to a speed value for reference curves such as an optimal speed curve 1410, an actual speed curve 1420, and/or a safe speed curve 1430. A geographic location of the vehicle may be matched to road segments from a map database using a positioning engine. The driver behavior engine may use data related to the path 1460 and/or selected profiles from a profile database to generate corresponding reference curves.

In the example of FIG. 14, the first point 1470 indicates a starting point for the current evaluation segment. Such a starting point may be based on various algorithms and/or parameters (e.g., distance from the current position, starting point of a navigation, etc.). In this example, the actual speed of the vehicle (as represented by actual speed curve 1420) exceeds the optimal speed (as represented by optimal speed curve 1410), but does not exceed the safe speed (as represented by safe speed curve 1430) at point 1470. As the vehicle moves along the path 1460 from point 1470 to point 1475, the actual speed exceeds the optimal speed and the safe speed, as represented by zone 1440. From point 1475 to point 1480, where the section is identified as a curve, the actual speed exceeds the optimal speed and the safe speed, as indicated by zone 1450. After the vehicle passes point 1480, the actual speed drops below the safe speed threshold, but still exceeds the optimal speed threshold. This condition is maintained as the vehicle passes points 1485 and 1490.

Figure 15:
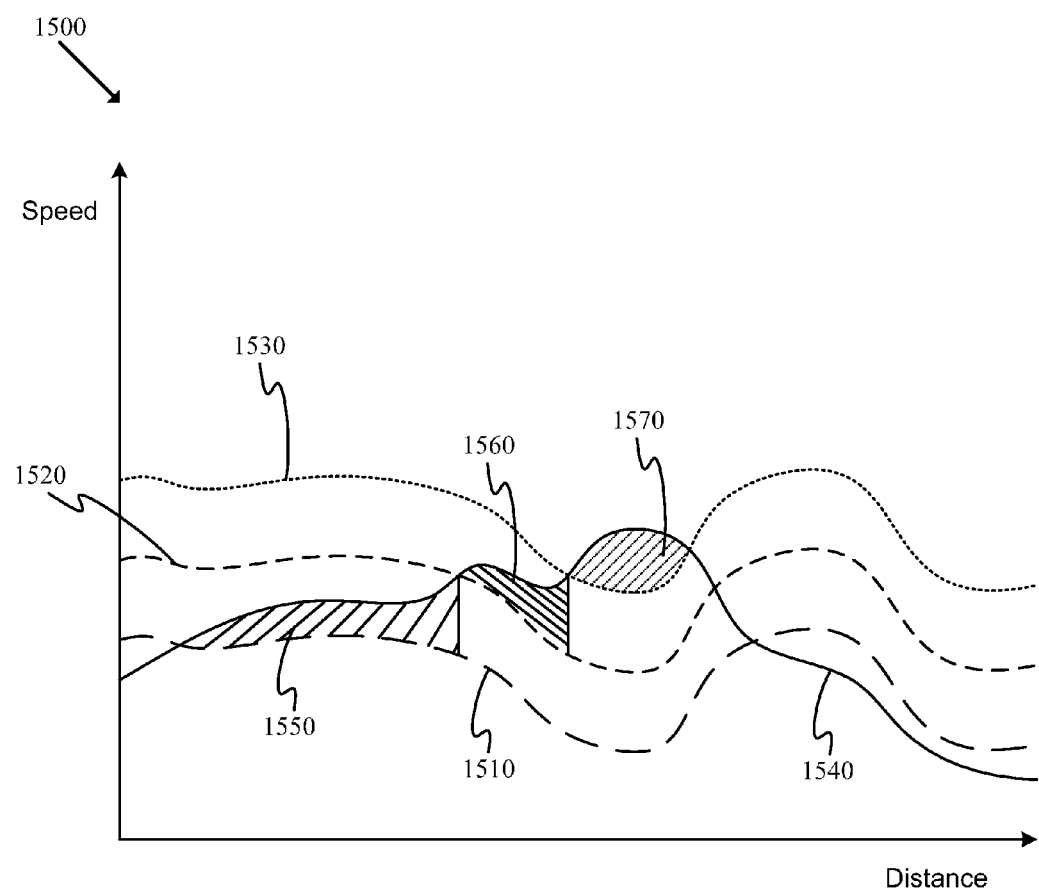
FIG. 15 illustrates an x-y plot with example safety curves according to some embodiments of the invention.

FIG. 15 illustrates an x-y plot 1500 with example safety curves according to some embodiments of the invention. Specifically, this figure shows graded analysis of various driver behaviors. As shown, the x-y plot may include a warning level curve 1510, a severe level curve 1520, a critical level curve 1530, an actual speed curve 1540, a violation warning event zone 1550, a severe violation warning event zone 1560, and a critical violation warning event zone 1570.

The warning level curve, 1510, severe level curve 1520, and critical level curve 1530 may indicate safety bounds for given characteristics beyond which driving behavior is unsafe. The actual speed curve 1540 may indicate the actual speed of the vehicle. The violation warning event zone 1550, severe violation warning event zone 1560, and critical violation warning event zone 1570 may be used to warn drivers of safety violations and/or unsafe driving behavior (and/or may be recorded for later analysis).

The safety curves may define safety thresholds for a given characteristic. For example, the safety curves in FIG. 15 may define the safety bounds for vehicle speed. As shown, the warning level curve 1510, severe level curve 1520, and critical level curve 1530 may indicate the level above which one or more warning events 1550, severe warning events 1560, and critical warning events 1570 may occur, respectively. The driver behavior engine 205 may be configured (via the profiles from the profile database 210) to have various different numbers of safety curve levels, to have different meanings for different safety curve levels, and/or different corresponding actions to execute in response. For example, some embodiments may be configured to record a violation above the warning level curve 1510 with a soft notification to the driver (e.g., an audio signal). A more prominent notification may be used for a violation above the severe warning level curve 1520 (e.g., an audio signal and visual indicator). For violations above the critical warning level curve 1530, the driver behavior engine 205 may provide the highest level of notification (e.g., loud audible reminder, flashing lights, etc.).

Figure 16:
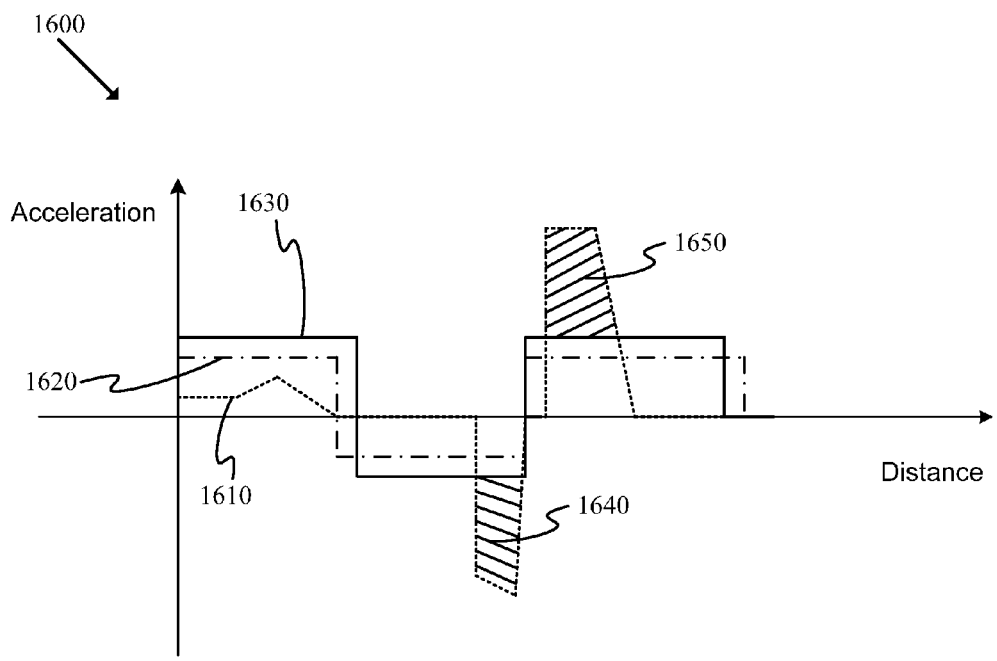
FIG. 16 illustrates an x-y plot with example acceleration curves according to some embodiments of the invention.

FIG. 16 illustrates an x-y plot 1600 with example acceleration/deceleration curves according to some embodiments of the invention. Specifically, this figure shows a set of curves that may be used to evaluate performance of a driver related to sensed acceleration. As shown, the x-y plot may include an actual acceleration curve 1610, an optimal acceleration curve 1620, a safe acceleration curve 1630, a sudden deceleration violation 1640, and a sudden acceleration violation 1650.

The actual acceleration curve 1610 may be determined using various appropriate vehicle sensors (e.g., GPS, wheel sensors, accelerometers, On-Board Diagnostics (OBD) data, CAN data, etc.). The optimal acceleration curve 1620 and safe acceleration curve 1630 may be determined based on known points of acceleration/deceleration (e.g., stop signs, traffic lights, "T" junctions, and/or other features identified from map data), and/or predicted future possible paths.

The sudden deceleration violation 1640 and sudden acceleration violation 1650 may indicate regions of unsafe deceleration and acceleration, respectively. A sudden deceleration violation 1640 occurs when actual deceleration is below the safe acceleration curve 1630. Similarly, a sudden acceleration violation 1650 occurs when actual acceleration exceeds the safe acceleration curve 1630.

Figure 17:
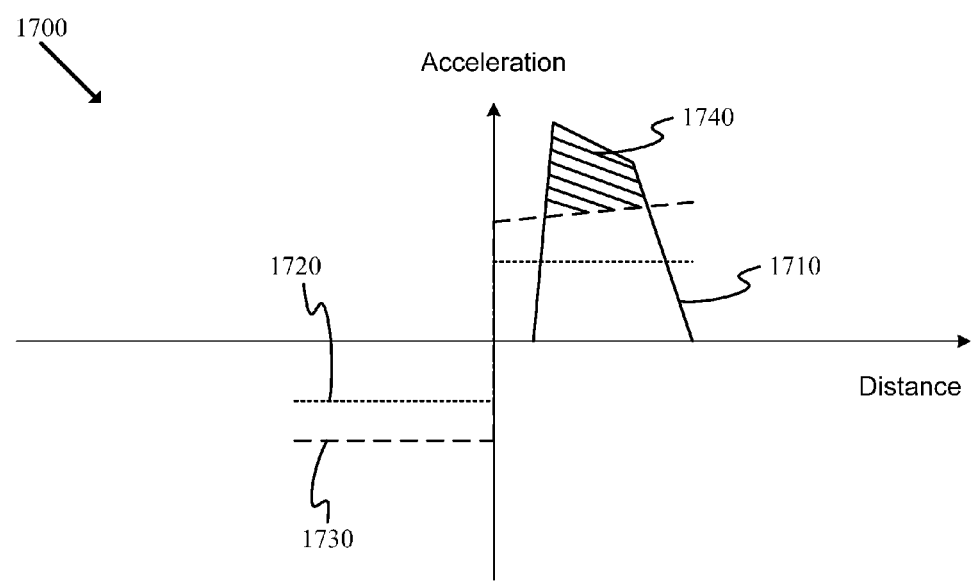
FIG. 17 illustrates an x-y plot with example static acceleration curves according to some embodiments of the invention.

FIG. 17 illustrates an x-y plot 1700 with example static acceleration curves according to some embodiments of the invention. Specifically, this figure shows a set of curves that may be used to evaluate performance of a driver related to sensed static acceleration. As shown, the x-y plot may include an actual acceleration curve 1710, an optimal static acceleration curve 1720, a safe static acceleration curve 1730, and a sudden static acceleration violation zone 1740.

In real-time driving systems, the exact location of acceleration/deceleration may be difficult to ascertain, and therefore, respective behavior curves may be difficult to generate. Instead, static acceleration curves may be used to provide real-time warnings and/or driving guidance.

The actual acceleration curve 1710 may be determined using various appropriate vehicle sensors. The optimal static acceleration curve 1720 and safe static acceleration curve 1730 may be determined based on vehicle characteristics (e.g., vehicle weight, size, etc.), weather conditions (which may be determined by temperature sensors, a barometric pressure sensor, windshield wiper data, head-light data, etc.), and/or position of the accelerator pedal (which may be determined by OBD-II, for example). The optimal static acceleration curve 1720 and safe static acceleration curve 1730 may also be determined based on known points of acceleration/deceleration, and predicted future possible points.

The sudden static acceleration violation zone 1740 may indicate a region of unsafe static acceleration. A sudden static acceleration violation 1740 occurs when actual static acceleration (as represented by curve 1710) exceeds the safe static acceleration (as represented by curve 1730).

Figure 18:
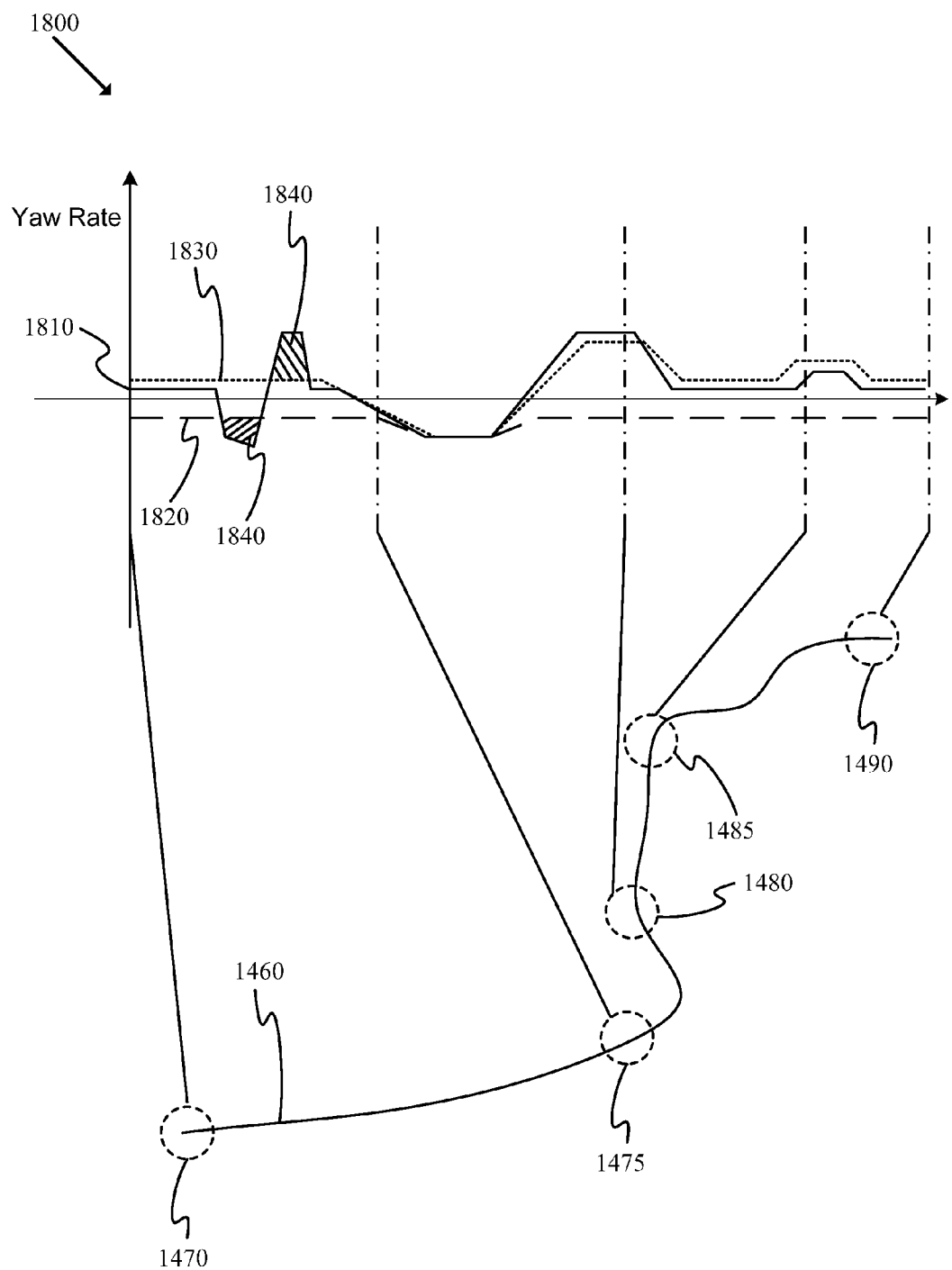
FIG. 18 illustrates an x-y plot with example yaw rate curves according to some embodiments of the invention.

FIG. 18 illustrates an example yaw rate curves diagram 1800 according to some embodiments of the invention. Specifically, this figure shows a set of curves that may be used to evaluate performance of a driver related to sensed yaw rate. As shown, the diagram may include an actual yaw rate curve 1810, a safe yaw rate curve 1820, an optimal yaw rate curve 1830, unsafe yaw rate zones 1840, driving path 1460, and various points 1470-1490 along the driving path 1460.

The actual yaw rate curve 1810 may be determined using elements such as gyroscopes, GNSS receivers (GPS, GLONASS, Galileo, Beidou system, etc.), differential wheel sensors, steering wheel angle sensors, etc. The yaw rate may be measured in degrees per second. The safe yaw rate curve 1820 and optimal yaw rate curve 1830 may be determined based on vehicle characteristics (e.g., vehicle weight, size, etc.), weather conditions (which may be determined by temperature sensors, a barometric pressure sensor, windshield wiper data, head-light data, etc.), map data (road shape, road curvature, lane information, road width, posted speed limit, road banking, etc.), speed, and/or position of the accelerator pedal. The safe yaw rate curve 1820 and optimal yaw rate curve 1830 may also be determined based on known driving points, and predicted future possible points.

The unsafe yaw rate zones 1840 may indicate an unsafe yaw rate region. An unsafe yaw rate violation occurs when yaw rate exceeds the safe yaw rate. The yaw rate may be used to detect sudden turns or lane changes. At high speeds large yaw rates may lead to vehicles rolling over and/or other traffic accidents. For example, sudden turns and lane changes might be an indicator of a distracted driver. The unsafe yaw rate zone may be used to avoid these types of accidents and/or unsafe lane changes.

The shape and features of the driving path 1460 may be determined using map data. Map data regarding the shape and features of the road may be used to calculate the safe yaw rate curve 1820, optimal yaw rate curve 1830, and unsafe yaw rate zones 1840. Unsafe lane changes may be detected by high yaw rate values that do not match expected yaw rates based on the road geometry.

Figure 19:
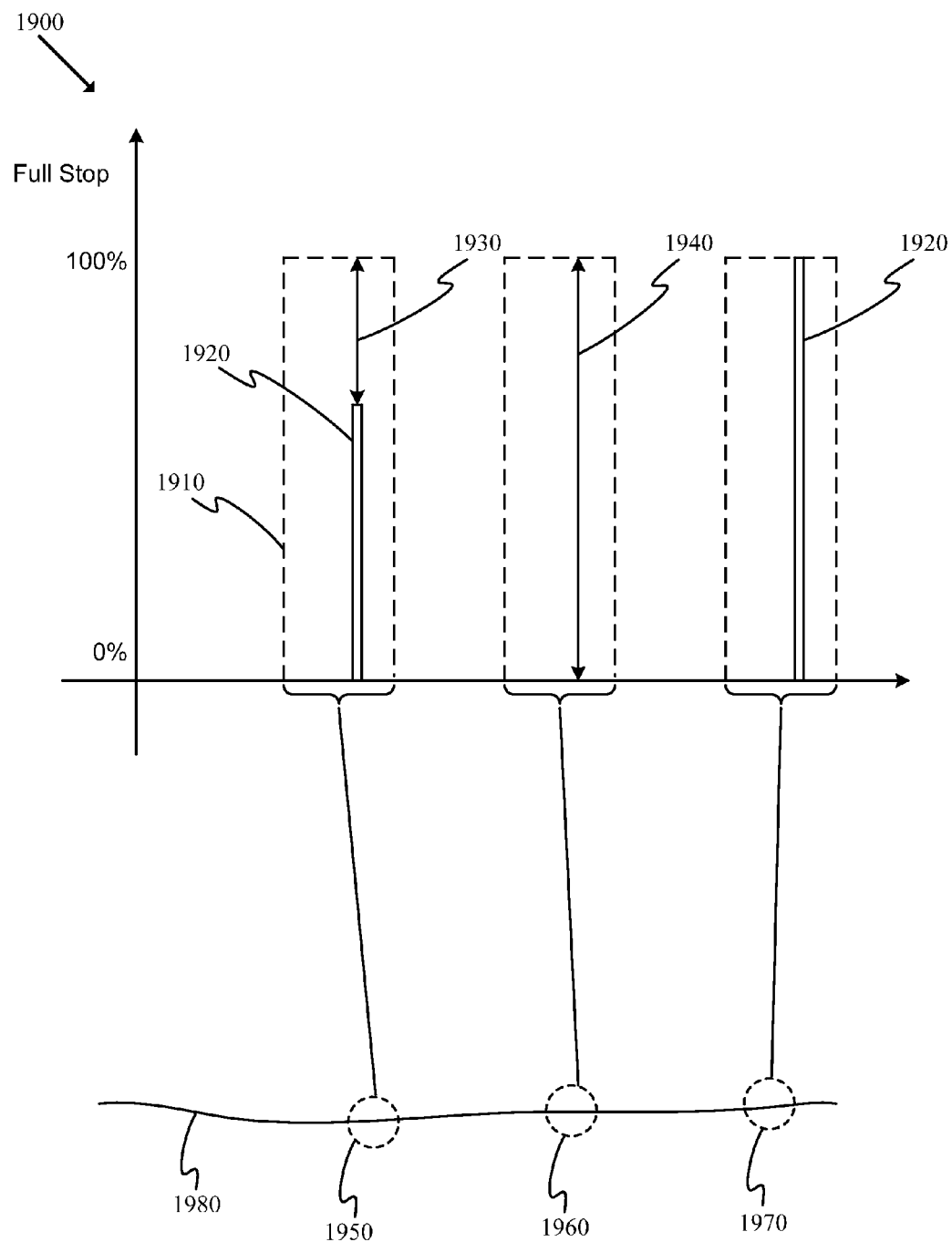
FIG. 19 illustrates an x-y plot with example stop curves according to some embodiments of the invention.

FIG. 19 illustrates an x-y plot 1900 with example stop curves according to some embodiments of the invention. Specifically, this figure shows a set of curves that may be used to evaluate performance of a driver related to sensed movement. As shown, the x-y plot includes a safe stop range curve 1910, an actual stop curve 1920, a rolling stop violation 1930, a non-stopping violation 1940, and corresponding points 1950-1970 along a path 1980 where respective stops are expected to occur.

Stopping behavior may be determined by measuring a vehicle's speed via various appropriate vehicle sensors. For example, a 100% stop may be determined if a vehicle stays at a speed of 0 mph for a predefined period of time (e.g., 1-2 seconds). Using this approach, stops may appear as spikes on a graph. The safe stop range curve 1910 may be determined using map information such as stop sign, intersection, traffic light, and/or other map attribute data. Because of potential traffic and/or road conditions, the exact place where a vehicle needs to stop may be undetermined. To account for such variability, the stop curves use ranges. For example, a vehicle may need to stop a certain distance before a stop sign and/or stop light if there are other vehicles ahead of it. Various frontal distance vehicle sensors (e.g., radar, camera systems, etc.) may be used to detect the presence of other vehicles, which may affect the safe stop range curve 1910.

The safe stop range curve may be determined from data regarding traffic lights (with additional vehicle sensors 120 for detecting red lights), stop signs, approaching/crossing a major road, railroad crossings, left turns at intersections without traffic lights, etc. The safe stop range curve 1910 may also be determined from speed and acceleration data, weather conditions (e.g., wet conditions may necessitate earlier stopping), road construction data, etc. The actual stop curve 1920 may indicate where and for how long a vehicle stops, and the whether or not a vehicle comes to a complete stop.

A rolling stop violation 1930, which corresponds to point 1950 representing a stop, may be determined if a vehicle does not reach 0 mph and/or does not remain at 0 mph for a predetermined period of time. A non-stopping violation 1940, which corresponds to point 1960, may indicate if a vehicle fails to stop at a required road stop. Point 1970 corresponds to a required stop where the vehicle performed a proper stop.

One of ordinary skill in the art will recognize that the diagrams 1300-1900 are conceptual in nature and may be implemented in various different ways without departing from the spirit of the invention. For instance, various alternative paths and/or sets of points may be used. In a similar manner other behavior curves may be created for additional measurable driving characteristics such as frontal distance, driver alertness, shift gear position, etc. In addition, various other driving data may be utilized and/or included. Furthermore, various numbers of thresholds may be defined.

VII. Process for Defining a Driver Behavior Engine Application

Figure 20:
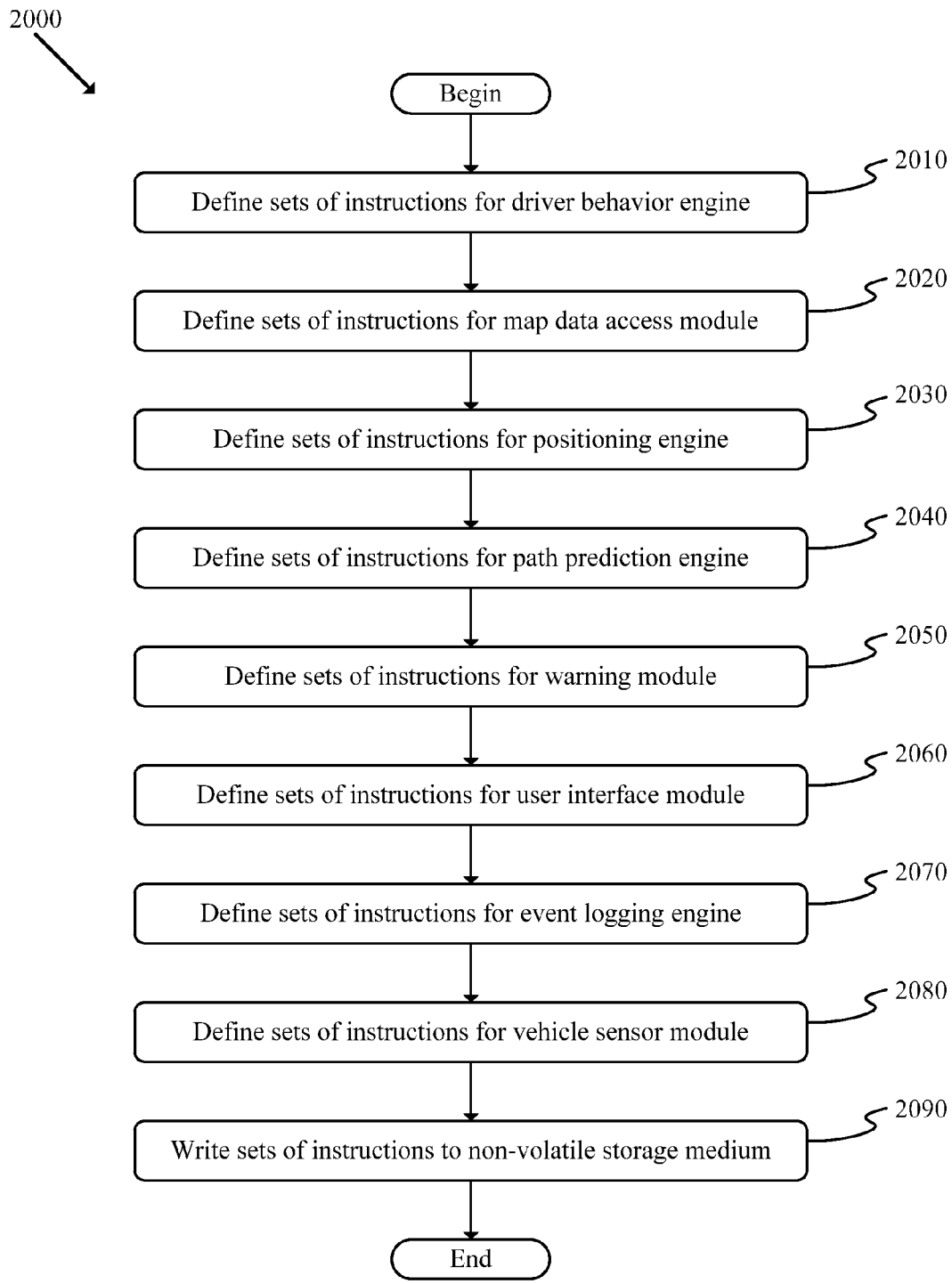
FIG. 20 illustrates a flow chart of a conceptual process used by some embodiments to define and store an application of some embodiments.

FIG. 20 conceptually illustrates a process 2000 of some embodiments for defining and storing a set driver behavior engine applications of some embodiments, such as the application provided by system 200 described above in reference to FIG. 2. Specifically, process 2000 illustrates the operations used to define sets of instructions for providing several of the elements shown in the driver behavior engine application system 200 and for performing various operations described above.

As shown, the process may define (at 2010) sets of instructions for providing a driver behavior engine. The process may then define (at 2020) sets of instructions for providing a map data access module. Next, the process may define (at 2030) sets of instructions for providing a positioning engine. Process 2000 may then define (at 2040) sets of instructions for providing a path prediction engine. The process may then define (at 2050) sets of instructions for providing a warning module. Next, the process may define (at 2060) sets of instructions for providing an optional user interface module. Process 2000 may then define (at 2070) sets of instructions for providing an event logging engine. The process may then define (at 2080) sets of instructions for providing a vehicle sensor module. The process may then write (at 2090) the sets of instructions defined at operations 2010-2080 to a non-volatile storage medium.

One of ordinary skill in the art will recognize that the various sets of instructions defined by process 2000 are not exhaustive of the sets of instructions that could be defined and established on a non-volatile storage medium for driver behavior engine applications incorporating some embodiments of the invention. In addition, process 2000 is a conceptual process, and the actual implementations may vary. For example, different embodiments may define the various sets of instructions in a different order, may define several sets of instructions in one operation, may decompose the definition of a single set of instructions into multiple operations, etc. In addition, process 2000 may be implemented as several sub-processes or combined with other operations within a macro-process.

VIII. Computer System

Many of the processes and modules described above may be implemented as software processes that are specified as at least one set of instructions recorded on a non-transitory storage medium. When these instructions are executed by one or more computational element(s) (e.g., microprocessors, microcontrollers, Digital Signal Processors (DSP), Application-Specific ICs (ASIC), Field Programmable Gate Arrays (FPGA), etc.) the instructions cause the computational element(s) to perform actions specified in the instructions.

Figure 21:
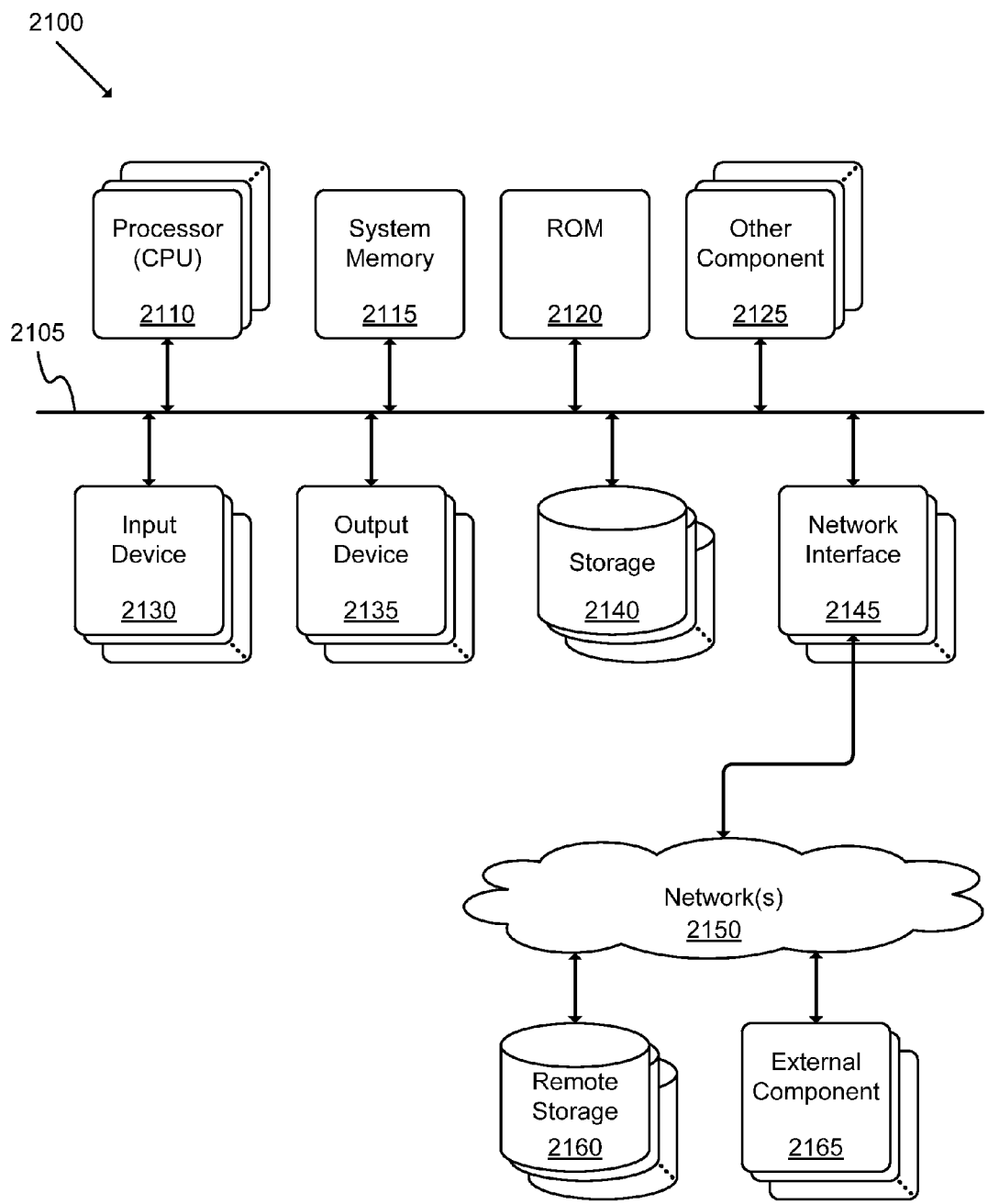
FIG. 21 illustrates a schematic block diagram of a conceptual computer system with which some embodiments of the invention may be implemented.

FIG. 21 conceptually illustrates a schematic block diagram of a computer system 2100 with which some embodiments of the invention may be implemented. For example, the systems described above in reference to FIGS. 1-3 may be at least partially implemented using computer system 2100. As another example, the processes described in reference to FIGS. 8-12 may be at least partially implemented using sets of instructions that are executed using computer system 2100.

Computer system 2100 may be implemented using various appropriate devices. For instance, the computer system may be implemented using one or more personal computers (PCs), servers, mobile devices (e.g., a Smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

Computer system 2100 may include a bus 2105, at least one processing element 2110, a system memory 2115, a read-only memory (ROM) 2120, other components (e.g., a graphics processing unit) 2125, input devices 2130, output devices 2135, permanent storage devices 2140, and/or network interfaces 2145. The components of computer system 2100 may be electronic devices that automatically perform operations based on digital and/or analog input signals.

Bus 2105 represents all communication pathways among the elements of computer system 2100. Such pathways may include wired, wireless, optical, and/or other appropriate communication pathways. For example, input devices 2130 and/or output devices 2135 may be coupled to the system 2100 using a wireless connection protocol or system. The processor 2110 may, in order to execute the processes of some embodiments, retrieve instructions to execute and data to process from components such as system memory 2115, ROM 2120, and permanent storage device 2140. Such instructions and data may be passed over bus 2105.

ROM 2120 may store static data and instructions that may be used by processor 2110 and/or other elements of the computer system. Permanent storage device 2140 may be a read-and-write memory device. This device may be a non-volatile memory unit that stores instructions and data even when computer system 2100 is off or unpowered. Permanent storage device 2140 may include a mass-storage device (such as a magnetic or optical disk and its corresponding disk drive).

Computer system 2100 may use a removable storage device and/or a remote storage device as the permanent storage device. System memory 2115 may be a volatile read-and-write memory, such as a random access memory (RAM). The system memory may store some of the instructions and data that the processor uses at runtime. The sets of instructions and/or data used to implement some embodiments may be stored in the system memory 2115, the permanent storage device 2140, and/or the read-only memory 2120. For example, the various memory units may include instructions for creating 3D online events in accordance with some embodiments.

Other components 2125 may perform various other functions. These functions may include, for example, 3D rendering functions.

Input devices 2130 may enable a user to communicate information to the computer system and/or manipulate various operations of the system. The input devices may include keyboards, cursor control devices, audio input devices and/or video input devices. Output devices 2135 may include printers, displays, and/or audio devices. Some or all of the input and/or output devices may be wirelessly or optically connected to the computer system.

Finally, as shown in FIG. 21, computer system 2100 may be coupled to a network 2150 through a network interface 2145. For example, computer system 2100 may be coupled to a web server on the Internet such that a web browser executing on computer system 2100 may interact with the web server as a user interacts with an interface that operates in the web browser. In some embodiments, the network interface 2145 may include an API that may allow third-party applications running on external devices to access the system 2100. Such an API may allow third-party applications to access data, instructions, functionality, etc. that may be provided by the system 2100. For instance, such an API may allow third-party applications to retrieve system data for external analysis.

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 2100 may be used in conjunction with the invention. Moreover, one of ordinary skill in the art will appreciate that many other system configurations may be used in conjunction with the invention or components of the invention.

Moreover, while the examples shown may illustrate many individual modules as separate elements, one of ordinary skill in the art would recognize that these modules may be combined into a single functional block or element. One of ordinary skill in the art would also recognize that a single module may be divided into multiple modules.

While the invention has been described with reference to numerous specific details, one of ordinary skill in the art will recognize that the invention can be embodied in other specific forms without departing from the spirit of the invention. For example, several embodiments were described above by reference to particular features and/or components. However, one of ordinary skill in the art will realize that other embodiments might be implemented with other types of features and components. One of ordinary skill in the art would understand that the invention is not to be limited by the foregoing illustrative details, but rather is to be defined by the appended claims.

I claim:

1. A system that monitors, records and analyzes driver performance, the system comprising:
   a vehicle sensor module that receives data from a set of sensors that each measure a driving characteristic associated with a vehicle;
   a map data access module that retrieves, from a map database, map data elements indicating various features associated with at least one path of the vehicle, wherein the at least one path comprises a set of previously-defined segments, each segment having a set of associated points, wherein each associated point comprises a set of associated attributes, each set of associated attributes comprising a set of fixed attributes, wherein each fixed attribute has an unchanging value for each set of associated points; and a driver behavior engine that:
- receives information from the vehicle sensor module and the map data access module, and monitors and evaluates driver performance based on the received information;
- retrieves a plurality of sets of evaluation curves based on the retrieved set of map data elements; and
- calculates mathematical differences between each evaluation curve from each set of evaluation curves and each of a plurality of corresponding performance curves generated at least partly based on the set of measured driving characteristics, wherein the mathematical differences are quantified at least partly by determining a geometrical area between each evaluation curve from each set of evaluation curves and each corresponding performance curve from the plurality of corresponding performance curves, wherein the sets of evaluation curves and the plurality of corresponding performance curves are associated with a particular driver and a particular trip.

2. The system of claim 1, wherein the vehicle sensor module receives data from at least one global navigation satellite system (GNSS) sensor.

3. The system of claim 1, wherein the vehicle sensor module receives data from at least one inertial sensor.

4. The system of claim 1, wherein the vehicle sensor module receives data from at least one radar sensor.

5. The system of claim 1 further comprising a path prediction engine that receives data from the vehicle sensor module and the map data access module and identifies a set of candidate links ahead of the vehicle in order to determine a set of potential paths available to the vehicle based at least partly on the received data, wherein:
- each potential path in the set of potential paths is associated with a particular probability, and
- each candidate link in the set of candidate links is associated with at least one potential path from the set of potential paths.

6. The system of claim 1 further comprising an event logging engine that receives data from the vehicle sensor module and records the received data to a database.

7. The system of claim 1 further comprising a warning module that determines whether data received from the vehicle sensor module exceeds any warning threshold.

8. An automated method that monitors, records and analyzes driver performance, the method comprising:
- receiving, at a vehicle sensor module, data from a set of sensors that each measure a driving characteristic associated with a vehicle;
- retrieving from a map database, at a map data access module, map data elements indicating various features associated with at least one path of the vehicle, wherein the at least one path comprises a set of previously-defined segments, each segment having a set of associated points, wherein each associated point comprises a set of associated attributes, each set of associated attributes comprising a set of fixed attributes, wherein each fixed attribute has an unchanging value for each set of associated points; and
- receiving, at a driver behavior engine, information from the vehicle sensor module and the map data access module, and monitoring and evaluating driver performance based on the received information;
- retrieving, at the driver behavior engine, a plurality of sets of evaluation curves based on the retrieved set of map data elements; and
- calculating, at the driver behavior engine, mathematical differences between each evaluation curve from each set of evaluation curves and each of a plurality of corresponding performance curves generated at least partly based on the set of measured driving characteristics, wherein the mathematical differences are quantified at least partly by determining a geometrical area between each evaluation curve from each set of evaluation curves and each corresponding performance curve from the plurality of corresponding performance curves, wherein the sets of evaluation curves and the plurality of corresponding performance curves are associated with a particular driver and a particular trip.

9. The automated method of claim 8 further comprising receiving, at the vehicle sensor module, data from at least one global navigation satellite system (GNSS) sensor.

10. The automated method of claim 8 further comprising receiving, at the vehicle sensor module, data from at least one inertial sensor.

11. The automated method of claim 8 further comprising receiving, at the vehicle sensor module, data from at least one radar sensor.

12. The automated method of claim 8 further comprising receiving, at a path prediction engine, data from the vehicle sensor module and the map data access module and identifying a set of candidate links ahead of the vehicle in order to determine a set of potential paths available to the vehicle based at least partly on the received data, wherein:
- each potential path in the set of potential paths is associated with a particular probability, and
- each candidate link in the set of candidate links is associated with at least one potential path from the set of potential paths.

13. The automated method of claim 8 further comprising receiving, at an event logging engine, data from the vehicle sensor module and recording the received data to a database.

14. The automated method of claim 8 further comprising determining, at a warning module, whether data received from the vehicle sensor module exceeds any warning threshold.

* * * * *